United States Patent
Saijo

(10) Patent No.: US 12,535,355 B2
(45) Date of Patent: Jan. 27, 2026

(54) IMAGE PICKUP APPARATUS, MEASURING APPARATUS, AND ARTICLE MANUFACTURING METHOD

(71) Applicant: CANON KABUSHIKI KAISHA, Tokyo (JP)

(72) Inventor: Soya Saijo, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 217 days.

(21) Appl. No.: 18/364,480

(22) Filed: Aug. 3, 2023

(65) Prior Publication Data

US 2024/0053197 A1 Feb. 15, 2024

(30) Foreign Application Priority Data

Aug. 12, 2022 (JP) .................. 2022-128654

(51) Int. Cl.
*G01J 3/02* (2006.01)
*G01J 3/04* (2006.01)
*G01J 3/28* (2006.01)

(52) U.S. Cl.
CPC ............. *G01J 3/0208* (2013.01); *G01J 3/021* (2013.01); *G01J 3/0289* (2013.01); *G01J 3/2823* (2013.01); *G01J 3/04* (2013.01); *G01J 2003/2826* (2013.01)

(58) Field of Classification Search
CPC .. G01J 3/0208; G01J 3/18; G01J 3/021; G01J 3/0289
See application file for complete search history.

(56) References Cited

U.S. PATENT DOCUMENTS

2021/0080401 A1* 3/2021 Kudo ................ G02B 27/1086
2022/0221339 A1* 7/2022 Yoon .................... G01J 3/0205

FOREIGN PATENT DOCUMENTS

| JP | 2015-506471 A | 3/2015 |
| JP | 2018-205132 A | 12/2018 |
| TW | 202020400 A | 6/2020 |
| WO | 2013/097874 A1 | 7/2013 |

OTHER PUBLICATIONS

TW Office Action issued by TIPLO on Jul. 10, 2025 in corresponding TW Patent Application No. 112125428, with English translation.

* cited by examiner

*Primary Examiner* — Kara E. Geisel
*Assistant Examiner* — Georgia Ariel Mitchell
(74) *Attorney, Agent, or Firm* — Carter, DeLuca & Farrell LLP

(57) ABSTRACT

An image pickup apparatus includes an image sensor, and an optical system configured to divide light from an area extending in a first direction of an object into a plurality of lights in a section orthogonal to the first direction, and to condense the plurality of lights on an imaging surface of the image sensor. A predetermined condition is satisfied.

10 Claims, 10 Drawing Sheets

IMAGE PICKUP APPARATUS, MEASURING APPARATUS, AND ARTICLE MANUFACTURING METHOD

BACKGROUND

Technical Field

One of the aspects of the embodiments relates to an image pickup apparatus configured to generate spectral image data of a test object (object to be measured or inspected).

Description of Related Art

A measuring method is used to acquire the thickness distribution of a test object from wavelength information (spectral waveform) obtained by receiving light from the test object with an image pickup apparatus (spectral image pickup apparatus) such as a hyperspectral camera. A measuring method disclosed in Japanese Patent Laid-Open No. 2018-205132 irradiates a test object with linear illumination light, divides (or splits) interference light generated as transmitted light or reflected light from the test object, acquires a spectrum waveform at each measurement point of the test object, and calculates the thickness of each measurement point from a peak position of the power spectrum obtained by performing wavenumber transform processing or Fourier transform processing for the spectrum waveform.

However, as in the measuring method in Japanese Patent Laid-Open No. 2018-205132, if the wavenumber transform processing is performed in the process of calculating the thickness, the sampling intervals in the wavenumber direction in the spectrum waveform does not become regular, and the fast Fourier transform (FFT) cannot be used in the Fourier transform processing. The FFT requires additional resampling processing so that the sampling intervals become regular, and thus the overall processing takes a long time and the measurement accuracy lowers. Although the power spectrum can be obtained by using the Lomb-Scargle method even if the sampling intervals are irregular, this processing needs a longer time than that of the FFT.

SUMMARY

An image pickup apparatus according to one aspect of the embodiment includes an image sensor, and an optical system configured to divide light from an area extending in a first direction of an object into a plurality of lights in a section orthogonal to the first direction, and to condense the plurality of lights on an imaging surface of the image sensor. The following inequalities are satisfied:

$$0.90 \leq \alpha_{21}/\alpha_{32} \leq 1.10$$

$$1 \times 10^{-12} \leq |\alpha_{23}| \leq 1 \times 10^{-6}$$

where $\lambda_1$, $\lambda_2$, and $\lambda_3$ are wavelengths of first light, second light, and third light among the plurality of lights, respectively, satisfying the following inequality, $z_1$, $z_2$, and $z_3$ are condensed positions of the first, second, and third lights on the imaging surface in the section, respectively, and $\alpha_{21}$ and $\alpha_{32}$ are defined as follows:

$$\lambda_1 < \lambda_2 < \lambda_3$$

$$\alpha_{21} = (z_2 - z_1)/(1/\lambda_2 - 1/\lambda_1)$$

$$\alpha_{32} = (z_3 - z_2)/(1/\lambda_3 - 1/\lambda_2)$$

A spectral imaging system and a measuring apparatus including the above image pickup apparatus also constitute another aspect of the embodiment. An article manufacturing method using the above image pickup apparatus also constitute another aspect of the embodiment.

Further features of the disclosure will become apparent from the following description of embodiments with reference to the attached drawings.

DESCRIPTION OF THE EMBODIMENTS

Referring now to the accompanying drawings, a description will be given of embodiments according to the disclosure. Each example uses an XYZ coordinate system as an absolute coordinate system and an xyz coordinate system as a local coordinate system for each optical surface. In the local coordinate system, an x-axis is an axis parallel to a normal at a vertex (origin) of the optical surface. A y-axis is an axis parallel to a Y-axis and orthogonal to the x-axis at the origin. A z-axis is an axis orthogonal to the x-axis and the y-axis. The Y-axis direction and the y-axis direction are set to imaging directions as first directions. The Z-axis direction and the z-axis direction are set to spectral (light-dividing) directions as second directions. The XY section and the xy section are set to imaging sections as first sections. The ZX section and zx section are set to spectral sections as second sections.

Figure 1:
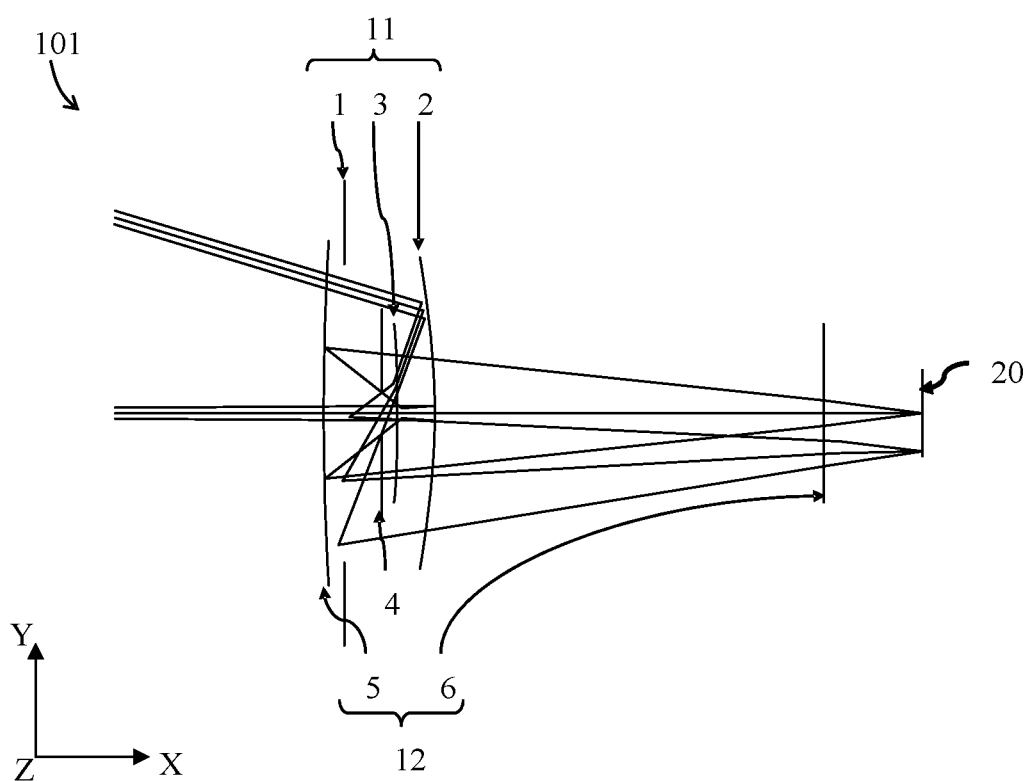
FIG. 1 is an XY sectional view illustrating the configuration of a spectral image pickup apparatus according to one example (numerical example 1).
Figure 2:
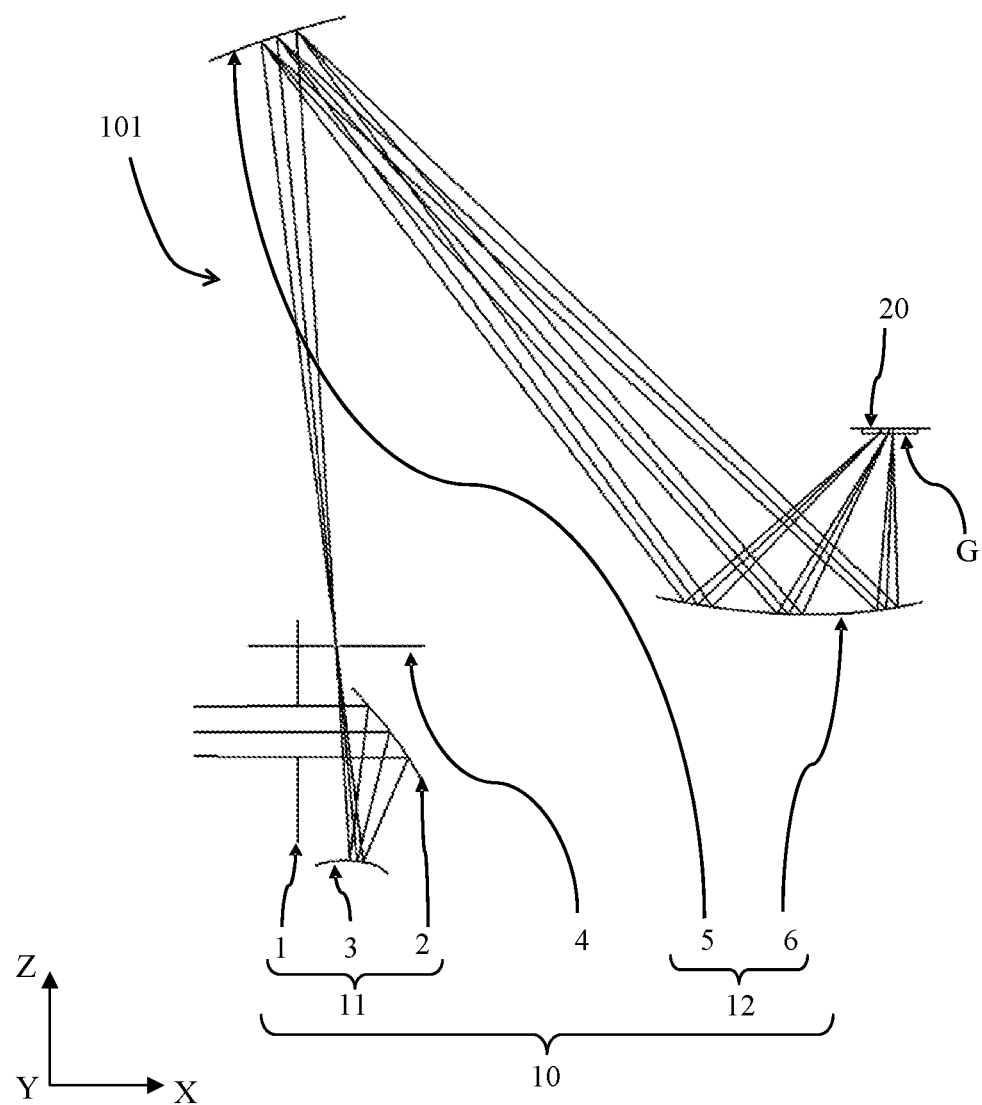
FIG. 2 is a ZX sectional view of the spectral image pickup apparatus according to numerical example 1.

FIG. 1 illustrates the imaging section of a spectral image pickup apparatus 101 as an image pickup apparatus according to this example. FIG. 2 illustrates the spectral section of the spectral image pickup apparatus 101. FIGS. 1 and 2 illustrate sections including an optical axis of an optical system of the spectral image pickup apparatus 101. FIG. 1 illustrates elements of the spectral image pickup apparatus 101 in the same section for convenience. The optical axis referred to herein indicates an axis corresponding to an optical path of an axial principal ray, which is a principal ray passing through the center of a slit of a light shielding member, which will be described below. FIGS. 1 and 2 omit a diffraction grating disposed on a diffractive surface, which will be described below, for convenience.

The spectral image pickup apparatus 101 includes a spectral optical system 10, and an image sensor 20 configured to receive an optical image formed by the spectral optical system 10 and to convert it into an electrical signal. In this example, a test object as an object is placed at a position near Z=0 on an object plane parallel to the YZ plane, and illumination light from an unillustrated illumination apparatus is applied to the test object.

The spectral image pickup apparatus 101 once images the reflected light of the illumination light from a linear imaging area (linear area) extending in the imaging direction on the test object with the image sensor 20, and acquires a plurality of pieces of image information images (one-dimensional image data) corresponding to each wavelength of light included in the reflected light. At this time, the spectral image pickup apparatus 101 may be configured as a multi-spectral camera that can acquire image information corresponding to wavelengths of four bands or more, which is more than a general camera. The spectral image pickup apparatus 101 may be configured as a hyperspectral camera that can acquire image information corresponding to wavelengths of 100 bands or more.

In the image sensor 20, a plurality of pixels are two-dimensionally arranged at regular intervals in each of the y direction and z direction. The image sensor 20 can use a CCD (Charge Coupled Device) sensor, a CMOS (Complementary Metal Oxide Semiconductor) sensor, or the like. The image sensor 20 may be configured to photoelectrically convert not only visible light but also infrared light (near-infrared light and far-infrared light). More specifically, an image sensor using a material such as InGaAs or InAsSb may be employed according to the use wavelength band. The number of pixels in the image sensor may be determined based on the required resolution in the y-axis and z-axis directions.

The spectral optical system 10 includes, in order from the object side (test object side) to the image side, a front group 11, a light shielding member (slit member) 4, and a rear group 12. The spectral optical system 10 forms an optical image of the test object on the light receiving plane (imaging surface) of the image sensor 20 by condensing light from the test object (not illustrated) positioned on the −X side. The front group 11 includes an aperture stop 1, a first reflective surface, and a second reflective surface 3. The rear group 12 has a third reflective surface (diffractive surface) 5 and a fourth reflective surface (diffractive surface) 6. A cover glass G is disposed just before the light receiving plane of the image sensor 20. In this example, the cover glass G is treated as not contributing to imaging.

The aperture stop 1 is a member configured to limit the width in the spectral direction of the light from the test object by its aperture, and is disposed so that its aperture plane is orthogonal to the x-direction. In this example, the aperture stop 1 is included in the spectral optical system 10, but the aperture stop may be provided outside the spectral optical system.

The light shielding member 4 has a slit as an opening longer in the imaging direction than in the spectral direction. The light shielding member 4 functions as a diaphragm that limits the width of the light in the imaging direction while limiting the angle of view within the imaging section of the spectral optical system 10 to block unnecessary light. The width of the slit in the spectral direction (z direction) is determined according to the required light amount, resolution, and the like. More specifically, the width of the slit in the spectral direction may be several μm to several hundred μm, which is shorter than the width (several mm) in the imaging direction (y direction). In a case where the width of the slit in the spectral direction becomes too large, the resolution on the light receiving plane of the image sensor 20 deteriorates, and in a case where the width becomes too small, effective light that contributes to imaging be easily shielded. The width of the slit in the spectral direction may be 10 μm or more and 0.2 mm or less.

An area other than the aperture stop 1 and the opening of the light shielding member 4 is a light shielding portion that does not transmit at least the light in the use wavelength band (designed wavelength band) of the spectral optical system 10. The aperture stop 1 and the light shielding member 4 can use a metal plate having a hole, a glass plate having a light shielding film formed by vapor deposition of chromium, or the like. Such a light shielding member 4 enables the spectral optical system 10 to form an optical image of a linear imaging area (test area) elongated in the imaging direction on the light receiving plane of the image sensor 20.

The first reflective surface 2 and the second reflective surface 3 are reflective surfaces obtained by providing a reflective coating on a base surface having a free-form surface shape. The base surface of each reflective surface is formed by processing a block material made of glass, resin, metal, or the like by cutting, polishing, molding, or the like. The reflective coating may have a spectral reflection characteristic that realizes sufficient energy efficiency (light utilization efficiency) in the use wavelength band. The reflective coating may be omitted in a case where the base surface has a sufficient reflectance in the use wavelength band.

In this example, the first reflective surface 2 and the second reflective surface 3 are aspherical surfaces, specifically anamorphic surfaces (anamorphic reflective surfaces) having different curvatures (powers) between the imaging section and the spectral section. Thereby, different optical actions can be produced between the imaging section and the spectral section. Each reflective surface of the front group 11 may not be an anamorphic surface. For example, each reflective surface may be spherical and an anamorphic refractive surface may be provided instead. However, in order to reduce the number of optical surfaces in the front group 11, at least one of the first reflective surface 2 and the second reflective surface 3 may be an anamorphic surface.

The rear group 12 has a plurality of dispersion elements. A diffractive element or a prism can be used as the dispersion element. This example uses a plurality of reflective diffractive elements, and the base surfaces of the diffractive surfaces 5 and 6 are aspheric surfaces (anamorphic surfaces). An optical system having only a single dispersion element needs to have a large size, in addition to satisfying inequality (1) described below, in order to obtain good imaging performance for a plurality of lights having respective wavelengths separated by the diffractive surface. Therefore, a plurality of dispersion elements, at least two dispersion elements, may be provided as in this example. In a case where a dispersion element is provided in the front group 11, lights of only part of the wavelengths can pass through the opening of the light shielding member 4. Therefore, the dispersion element may be provided to the rear group 12.

In order to suppress aberration by sharing the power among a plurality of optical surfaces in the spectral optical system 10, all the optical surfaces included in the front group 11 and the rear group 12 may be anamorphic surfaces. The configurations of the front group 11 and the rear group 12 are not limited, and the number of optical surfaces in each group optical system may be increased or decreased. A transmissive diffractive surface may be used. However, in order to reduce the size and number of components of the entire spectral optical system 10, each of the front group 11 and the rear group 12 may include two reflective surfaces as in this example.

A prism or an internal reflection mirror may be used as a reflective member including a reflective surface, if necessary. However, in order to suppress chromatic aberration as described above, the reflective member may be an external reflection mirror and the reflective surface be adjacent to the air. At least one optical surface may be a refractive surface (transmissive surface) if necessary.

Especially in the rear group 12, since a holding member, wiring, and the like (not illustrated) are disposed around the light shielding member 4 and the light receiving plane, it is difficult to secure sufficient space for the refractive (dioptric) optical element. Even if sufficient space could be secured, a plurality of refractive optical elements would need to be disposed in order to satisfactorily correct chromatic aberration, and the size of the entire system would increase. Therefore, at least all optical surfaces included in the rear group 12 may be reflective surfaces. All the optical surfaces included in the front group 11 may be reflective surfaces.

The third reflective surface 5 and the fourth reflective surface 6 are diffractive surfaces (hereinafter referred to as diffractive surfaces 5 and 6, respectively) including a base surface and a diffraction grating provided to the base surface. Each of the base surfaces of the diffractive surfaces 5 and 6 has a free-form surface shape similarly to the other reflective surfaces. The diffraction grating includes a plurality of gratings (convex portions) disposed at a pitch ranging from submicron to micron order, and the height of each grating also ranges from the submicron to micron order. The shape in the spectral section of the diffraction grating may be a diffraction grating having a stepped shape, a rectangular concave-convex shape, a blaze shape, a SIN wave shape, or the like. The shape of the diffraction grating is selected in consideration of the required diffraction efficiency and manufacturability. This example uses a blaze shape, which is relatively easy to improve the diffraction efficiency and facilitate manufacturing.

The base surface is formed in a manner similar to that of the other reflective surfaces described above. The diffraction grating can be formed by processing such as cutting or polishing the base surface. However, the diffraction grating may be formed at the same time as forming the base surface. For example, a fine concave-convex structure may be provided on the surface of a mirror piece that constitutes a mold, and the diffraction grating may be provided by molding using the mold.

In order to improve the diffraction efficiency of the diffractive surfaces 5 and 6, a reflective coating may be provided on the surface of the diffraction grating.

The base surfaces of the diffractive surfaces 5 and 6 may be anamorphic surfaces having different curvatures between the imaging section and the spectral section. Thereby, power can be shared with other anamorphic surfaces, and correction of aberrations becomes easy. In this example, the base surfaces of the diffractive surfaces 5 and 6 are anamorphic surfaces, but the base surfaces may be flat or spherical so that manufacturing of the diffraction grating becomes easier.

Referring now to FIGS. 1 and 2, a description will be given of the optical actions of the spectral optical system 10. Light (reflected light) from the test object passes through the aperture in the aperture stop 1, is reflected by the first reflective surface 2 and the second reflective surface 3 in this order, and reaches the light shielding member 4. At this time, the front group 11 does not form an optical image of the test object on the slit in the light shielding member 4 in the imaging section, but forms an intermediate image of the test object on the slit in the spectral section. That is, the front group 11 is configured such that the focal position does not coincide with the object plane in the imaging section. Thereby, a linear intermediate image (line image) that is long in the imaging direction is formed on the slit in the light shielding member 4. The term "on the slit" used here includes not only the exact position of the slit, but also a position that slightly shifts from the position of the slit in the optical axis direction and can be optically regarded as the position of the slit.

The light passing through the slit of the light shielding member 4 is divided into a plurality of lights with different wavelengths by the diffractive surface 5 in the spectral section. At this time, since the diffraction grating on the diffractive surface 5 has a plurality of gratings (ridge lines) arranged in the spectral direction, the light incident on the diffractive surface 5 undergoes spectral action only in the spectral direction, and does not undergo spectral action in the imaging direction. The plurality of lights divided by the diffractive surface 5 are diffracted by the diffractive surface 6 and enter the light receiving plane of the image sensor 20. At this time, the plurality of lights having different wavelengths from the diffractive surface 6 are condensed at different positions on the light receiving plane of the image sensor 20 in the spectral section. That is, the spectral optical system 10 according to this example can form a plurality of optical images (spectral images) on the image sensor 20 for respective wavelengths.

Thus, the spectral optical system 10 according to this example has different optical operations between the imaging section including the imaging direction and the spectral section including the spectral direction. More specifically, in the imaging section, the light from the test object is imaged on the light receiving plane of the image sensor 20 without forming an intermediate image on the slit in the light shielding member 4, and in the spectral section, an intermediate image of the light from the test object is formed on the slit in the light shielding member 4 and then re-imaged on the light receiving plane. That is, the spectral optical system 10 forms an image of the light from the test object once in the imaging section, and forms an image of the light from the test object twice in the spectral section.

Assume that $z_1$ is a position in the spectral direction on the light receiving plane of the image sensor 20 and a condensed position (imaging position) of first light having a wavelength $\lambda_1$ divided by the spectral optical system 10, $z_2$ is a condensed position of second light having a wavelength $\lambda_2$ longer than the wavelength and $z_3$ is a condensed position of third light having a wavelength $\lambda_3$ longer than the wavelength $\lambda_2$ ($\lambda_1 < \lambda_2 < \lambda_3$). Also, assume the following relationships:

$$\alpha_{21} = (z_2 - z_1)/(1/\lambda_2 - 1/\lambda_1)$$

$$\alpha_{32} = (z_3 - z_2)/(1/\lambda_3 - 1/\lambda_2)$$

Then, the spectral optical system 10 satisfies the following inequality (1):

$$0.90 \leq \alpha_{21}/\alpha_{32} \leq 1.10 \quad (1)$$

Figure 13:
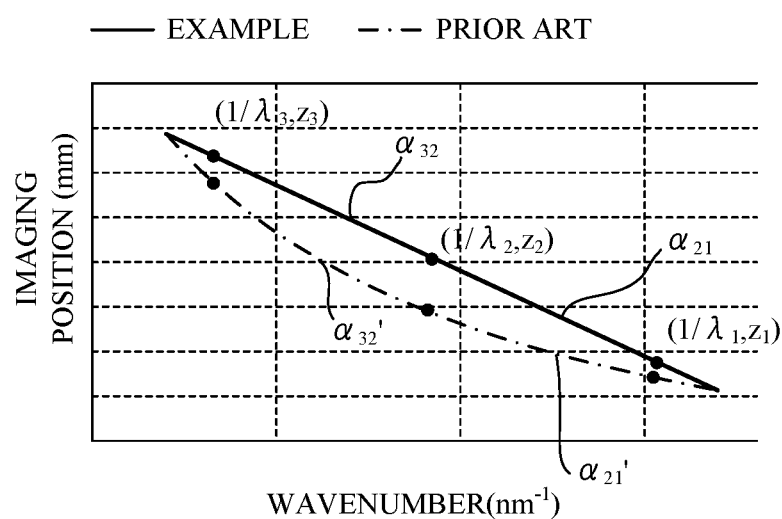
FIG. 13 illustrates a relationship between the wavenumber and imaging position in an example in which inequality (1) is satisfied and in a conventional example in which inequality (1) is not satisfied.

Inequality (1) expresses that, for a plurality of wavelengths, the ratio between a fluctuation amount in wavenumber (reciprocal of wavelength) and a fluctuation amount in a focal position on the image sensor 20 in the spectral direction (spectral section) is approximately equal. In other words, it means that a slope of a change in a condensed position in the spectral direction is almost equal to the wavenumber. A solid line in FIG. 13 illustrates the slope $\alpha_{21}$ between the first wavelength $\lambda_1$ and the second wavelength $\lambda_2$ and the slopes $\alpha_{32}$ between the second wavelength $\lambda_2$ and the third wavelength $\lambda_3$ are approximately equal in a case where the horizontal axis is the wavenumber and the vertical axis is the condensed position in the spectral direction.

A condensed position of a spectral image on the image sensor 20 in the spectral direction and the wavenumber of the spectral image have a linear relationship so as to satisfy inequality (1), and the pixels of the image sensor 20 are arranged at regular intervals. Therefore, spectral information of light divided at approximately regular intervals in the wavenumber space can be acquired.

For example, in a case where an image sensor having 150 pixels arranged in the spectral direction reads a wavelength range of 400 nm to 1000 nm, which is a range of $1.0 \times 10^6$ $m^{-1}$ to $2.5 \times 10^6$ $m^{-1}$ in terms of wavenumbers, spectral information can be acquired at approximately regular intervals of $1.0 \times 10^4$ $m^{-1}$/pixel. In a case where inequality (1) is not satisfied, a linear relationship between the condensed position of the spectral image and the wavenumber of the spectral image in the spectral direction is lost, and the light cannot be divided at approximately regular intervals in the wavenumber space.

Inequality (1) may be replaced with inequality (1a) below:

$$0.92 \leq \alpha_{21}/\alpha_{32} \leq 1.08 \quad (1a)$$

Inequality (1) may be replaced with inequality (1b) below:

$$0.94 \leq \alpha_{21}/\alpha_{32} \leq 1.06 \quad (1b)$$

Inequality (1) may be replaced with inequality (1c) below:

$$0.96 \leq \alpha_{21}/\alpha_{32} \leq 1.04 \quad (1c)$$

As described above, in order to satisfy inequality (1), the spectral optical system 10 may include at least two dispersion elements. The light that has entered the spectral optical system 10 is divided into a plurality of lights having different wavelengths in the spectral direction by the dispersion element closest to the object plane on the optical path among the at least two dispersion elements. The other dispersion element can introduce the divided light beams having a plurality of wavelengths to different positions in the spectral direction of the image sensor 20, and satisfactorily correct optical performance for each wavelength by properly setting the aspherical shape or diffraction grating shape in the spectral direction of the other dispersion element according to the wavelength. At this time, at least one of the at least two dispersion elements may be a diffractive element having a diffractive surface in which an aspherical surface is set to the base surface.

In order to satisfy inequality (1), lights having short wavelengths may be arranged more sparsely on the image sensor 20 than lights having long wavelengths. Therefore, it is necessary to change the dispersion for each wavelength so that a light separation amount separated by the dispersion element, that is, the dispersion, is large for short wavelengths and small for long wavelengths.

In a case where a diffractive element is used as the dispersion element, the dispersion is constant for each wavelength and thus it is difficult to change the dispersion for each wavelength with a single diffractive element. Therefore, one diffractive element separates light into lights having different wavelengths, and the other diffractive element reflects the lights having different wavelengths at different points so that the aspheric shape and diffraction grating shape of the diffractive surface have aspheric shapes in the spectral direction. Thereby, inequality (1) can be satisfied.

On the other hand, in a case where a prism is used as the dispersion element, the dispersion of the prism is large at short wavelengths and small at long wavelengths, so the dispersion differs for each wavelength. In order to satisfy inequality (1), it is necessary to correct the spectral position. Accordingly, as in the case of the diffraction grating, by adding another diffractive element and making the aspherical shape and the diffraction grating shape of the diffractive surface asymmetrical in the spectral direction, inequality (1) can be satisfied.

$\alpha_{21}$ may satisfy the following inequality (2):

$$1 \times 10^{-12} \leq |\alpha_{21}| \leq 1 \times 10^{-6} \quad (2)$$

$\alpha_{21}$ in inequality (2) is proportional to the number of bands per width in the spectral direction of the light imaging area (incidence area) in the image sensor 20. In a case where an becomes lower than the lower limit of inequality (2), the number of measurable bands decreases, and spectral information deteriorates. On the other hand, in a case where an becomes higher than the upper limit of inequality (2), the number of measurable bands increases, and it becomes difficult to secure a sufficient light amount in each band.

Inequality (2) may be replaced with inequality (2a) below:

$$1 \times 10^{-11} \leq |\alpha_{21}| \leq 1 \times 10^{-7} \quad (2a)$$

Inequality (2) may be replaced with inequality (2b) below:

$$1 \times 10^{-10} \leq |\alpha_{21}| \leq 1 \times 10^{-8} \quad (2b)$$

Numerical Example 1

A description will now be given of the spectral optical system 10 according to numerical example 1 corresponding to the above example. In this numerical example, an object distance, which is a distance from a test object to the aperture stop 1, is 450 mm, and a width of the imaging area in the imaging direction is 300 mm. The use wavelength band is 400 nm to 1000 nm, and the width in the spectral direction of the light imaging (incident) area in the light receiving plane of the image sensor 20 is 1.35 mm.

A description will now be given of equations that represent a shape of each optical surface of the spectral optical system 10. The equations described below are merely illustrative, and other equations may be used to represent each optical surface.

Meridional shapes as shapes in the imaging section (xy section) of the base surface of the first reflective surface 2, the second reflective surface 3, the third reflective surface (diffractive surface) 5, and the fourth reflective surface (diffractive surface) 6 as optical surfaces are represented by the following equation (3) in the local coordinate system of each optical surface:

$$x = \frac{y^2/R_y}{1+\sqrt{1-(1+K_y)(y/R_y)^2}} + B_2 y^2 + B_4 y^4 + B_6 y^6 \quad (3)$$

In equation (3), Ry is a meridional radius of curvature that is a radius of curvature in the imaging section, and $K_y$, $B_2$, $B_4$, and $B_6$ are aspheric coefficients in the imaging section. The aspheric coefficients $B_2$, $B_4$, and $B_6$ may have different numerical values on both sides of the x-axis (−y side and +y side). Thereby, the meridional shape can be made asymmetrical in the imaging direction with respect to the x-axis. Although second-order to sixth-order aspherical coefficients are used here, higher-order aspherical coefficients may be used.

A sagittal shape as the shape in the spectral section at any position in the imaging direction of the base surface of each optical surface is expressed by the following equation (4):

$$s = \frac{z^2/r'}{1+\sqrt{1-(1+K_z)(z/r')^2}} + \sum\sum m_{jk} y^j z^k \quad (4)$$

In equation (4), $K_z$ and $m_{jk}$ are aspheric coefficients in the spectral section. r' is a sagittal radius of curvature as a radius of curvature in a spectral section at a position away from the optical axis by y in the imaging direction (y-axis direction), and is expressed by the following equation (5):

$$\frac{1}{r'} = \frac{1}{r} + E_2 y^2 + E_4 y^4 \quad (5)$$

In equation (5), r is a sagittal radius of curvature on the optical axis, and $E_2$ and $E_4$ are sagittal change coefficients. In equation (5), in a case where r=0, the first term on the right side of equation (4) is treated as 0. The sagittal change coefficients $E_2$ and $E_4$ may have different numerical values on the −y side and the +y side. Thereby, an aspheric amount of the sagittal shape can be made asymmetric in the imaging direction. Although equation (5) includes only even terms, odd terms may be added. Higher order sagittal change coefficients may also be used.

The first-order term of z in equation (4) is a term that contributes to a tilt amount of the optical surface in the spectral section (a sagittal tilt amount). Therefore, by setting $m_{jk}$ to different numerical values between the −y side and the +y side, the sagittal tilt amount can be asymmetrically changed in the imaging direction. However, the sagittal tilt amount may be asymmetrically changed by using odd terms. The second-order term of z in equation (4) is a term that contributes to the sagittal radius of curvature of the optical surface. Therefore, to simplify the design of each optical surface, only the second-order term of z in equation (4) rather than equation (5) may be used to provide the sagittal radius of curvature to the optical surface.

The shape of each of the diffraction gratings on the diffractive surfaces 5 and 6 is not particularly limited as long as it can be represented by a phase function based on the known diffractive optical theory. This numerical example defines the shape of each of the diffraction gratings on the diffractive surfaces 5 and 6 using the phase function φ expressed by the following equation (6), where $\lambda_0$ is a fundamental wavelength (design wavelength) and C1, C2, and C3 are phase coefficients in the spectral section. At this time, the diffraction order of the diffraction grating is set to 1:

$$\phi = (2\pi/\lambda_0) \times ((C1 \times z) + (C2 \times z^2) + (C3 \times z^3)) \quad (6)$$

The fundamental wavelength here is the wavelength for determining the height of the diffraction grating, and is determined based on the spectral reflectances of reflective surfaces other than the diffractive surfaces 5 and 6, the spectral light-receiving sensitivity of the image sensor 20 including the light receiving plane, and the required diffraction efficiency. In other words, the fundamental wavelength corresponds to a wavelength that is prioritized in light detection on the light receiving plane. This numerical example sets the fundamental wavelength $\lambda_0$ to 700 nm so as to enable observation from the visible area to the near-infrared area to be performed in a well-balanced manner. However, for example, the fundamental wavelength may be set to about 850 nm so that the near-infrared area can be preferentially observed, or the fundamental wavelength may be set to about 550 nm so that the visible area in the use wavelength band can be preferentially observed.

Table 1 illustrates a position of a vertex of each optical surface in the spectral optical system 10 according to this numerical example, a direction of a normal at the vertex, and a radius of curvature in each section. In Table 1, the position of the vertex of each optical surface is indicated by the distances X, Y, Z [mm] from the origin in the absolute coordinate system, and the direction of the normal (x-axis) is the X-axis in the spectral section including the optical axis is indicated by an angle θ [deg] relative to the X-axis. d [mm] is a distance (surface distance) between the optical surfaces, and d' [mm] is a distance between the reflection points of the principal rays on each optical surface. $R_y$ and $R_z$ [mm] respectively represent radii of curvature in the imaging section and the spectral section at the reflection point of the principal ray. The radius of curvature of each reflective surface having a positive value means a concave surface, and the radius of curvature of each reflective surface having a negative value means a convex surface.

TABLE 1

|  |  | X | Y | Z | θ |
|---|---|---|---|---|---|
| APERTURE STOP | 1 | 0.000 | 0.000 | 0.000 | 0.000 |
| FIRST REFLECTIVE SURFACE | 2 | 11.000 | 0.000 | −0.120 | −142.304 |
| SECOND REFLECTIVE SURFACE | 3 | 6.429 | 0.000 | −15.251 | 87.729 |
| LIGHT SHIELDING MEMBER | 4 | 4.552 | 0.000 | 10.000 | 90.000 |
| THIRD REFLECTIVE SURAFCE | 5 | −2.525 | 0.000 | 81.836 | −72.063 |
| FOURTH REFLECTIVE SURFACE | 6 | 58.254 | 0.000 | 13.827 | 87.814 |
| COVER GLASS | 7 | 70.254 | 0.000 | 35.071 | 90.000 |
| LIGHT RECEIVING PLANE | 8 | 70.254 | 0.000 | 35.671 | 90.000 |

|  |  | d | d' | Ry | Rz |
|---|---|---|---|---|---|
| APERTURE STOP | 1 | 11.001 | 10.907 |  |  |
| FIRST REFLECTIVE SURFACE | 2 | 15.807 | 15.771 | 68.46878 | 50.83255 |
| SECOND REFLECTIVE SURFACE | 3 | 25.321 | 25.406 | −13.5429 | −19.3693 |

TABLE 1-continued

| | | | | | |
|---|---|---|---|---|---|
| LIGHT SHIELDING MEMBER | 4 | 72.184 | 72.187 | | |
| THIRD REFLECTIVE SURAFCE | 5 | 91.210 | 98.903 | 103.3676 | 105.2379 |
| FOURTH REFLECTIVE SURFACE | 6 | 24.399 | 20.675 | −338.337 | 74.61998 |
| COVER GLASS | 7 | 0.600 | 0.600 | | |
| LIGHT RECEIVING PLANE | 8 | | | | |

Table 2 illustrates the surface shape of each optical surface of the spectral optical system 10 according to this numerical example. The unit of $R_y$, $R_z$ and fundamental wavelength is mm, and ".E±M" means $\times 10^{\pm M}$.

TABLE 2

| | FIRST REFLECTIVE SURFACE | SECOND REFLECTIVE SURFACE | THIRD REFLECTIVE SURFACE | FOURTH REFLECTIVE SURFACE |
|---|---|---|---|---|
| Ry | 6.847.E+01 | −1.354.E+01 | 1.034.E+02 | −3.383.E+02 |
| Ky | −1.000.E+00 | −1.000.E+00 | 1.000.E+00 | −1.000.E+00 |
| B2 | 0.000.E+00 | 0.000.E+00 | 0.000.E+00 | 0.000.E+00 |
| B4 | −1.996.E−06 | −6.159.E−05 | 1.487.E−07 | −6.049.E−06 |
| B6 | −1.063.E−09 | −2.839.E−06 | −2.422.E−11 | 1.371.E−08 |
| Rz | 0.000.E+00 | 0.000.E+00 | 0.000.E+00 | 0.000.E+00 |
| Kz | 0.000.E+00 | 0.000.E+00 | 0.000.E+00 | 0.000.E+00 |
| E2 | 0.000.E+00 | 0.000.E+00 | 0.000.E+00 | 0.000.E+00 |
| E4 | 0.000.E+00 | 0.000.E+00 | 0.000.E+00 | 0.000.E+00 |
| m01 | 0.000.E+00 | 0.000.E+00 | 0.000.E+00 | 0.000.E+00 |
| m21 | 3.290.E−04 | 3.855.E−03 | 2.179.E−06 | −3.089.E−05 |
| m41 | −2.380.E−07 | 1.422.E−04 | −1.349.E−09 | 1.534.E−07 |
| m02 | 9.836.E−03 | −2.581.E−02 | 4.751.E−03 | 6.701.E−03 |
| m22 | 1.153.E−05 | −1.244.E−03 | −1.123.E−07 | 7.546.E−07 |
| m42 | −1.447.E−08 | −4.813.E−05 | 1.035.E−09 | 2.626.E−09 |
| m03 | 2.262.E−04 | 3.939.E−03 | 4.174.E−07 | −7.680.E−05 |
| m23 | 2.444.E−07 | 3.741.E−04 | −6.314.E−08 | 7.854.E−09 |
| m43 | −8.709.E−10 | 1.302.E−05 | 0.000.E+00 | −2.044.E−10 |
| m04 | 6.508.E−06 | −1.555.E−03 | 4.305.E−07 | 5.777.E−07 |
| m24 | 9.845.E−09 | −7.398.E−05 | 2.930.E−09 | −1.057.E−09 |
| m44 | −5.569.E−11 | 1.182.E−07 | 0.000.E+00 | −1.709.E−11 |
| m05 | 0.000.E+00 | 0.000.E+00 | 0.000.E+00 | 0.000.E+00 |
| m25 | 0.000.E+00 | 0.000.E+00 | 0.000.E+00 | 0.000.E+00 |
| m45 | 0.000.E+00 | 0.000.E+00 | 0.000.E+00 | 0.000.E+00 |
| m06 | 0.000.E+00 | 0.000.E+00 | 0.000.E+00 | 0.000.E+00 |
| m26 | 0.000.E+00 | 0.000.E+00 | 0.000.E+00 | 0.000.E+00 |
| m46 | 0.000.E+00 | 0.000.E+00 | 0.000.E+00 | 0.000.E+00 |
| c1 | | | 1.909.E−01 | 2.425.E−01 |
| c2 | | | 1.318.E−04 | −2.836.E−03 |
| c3 | | | 1.799.E−05 | 7.883.E−06 |
| FOUNDAMENTAL WAVELENGTH | | | 7.000.E−04 | 7.000.E−04 |
| DIFFRACTION ORDER | | | 1 | 1 |

Table 3 illustrates the sizes (diameter) [mm] of the aperture in the aperture stop 1, the slit in the light shielding member 4, and the light receiving plane of the image sensor 20 in the imaging direction (y-axis direction) and the spectral direction (z-axis direction). In this numerical example, the aperture of the aperture stop 1, the slit of the light shielding member 4, and the light receiving plane are all rectangular.

TABLE 3

| | APERTURE STOP | LIGHT SHIELDING MEMBER | LIGHT RECEIVING PLANE |
|---|---|---|---|
| DIAMETER (y) | 40.00 | 5.00 | 9.4 |
| DIAMETER (z) | 6.00 | 0.05 | 6 |

Table 4 illustrates an in a case where the first wavelength $\lambda_1$ and the second wavelength $\lambda_2$ are set to values in the table. As understood from Table 4, this numerical example satisfies inequality (2). In a case where the first wavelength and the second wavelength in Table 4 are replaced with the second wavelength $\lambda_2$ and the third wavelength $\lambda_3$ respectively, $\alpha_{32}$ is illustrated instead of $\alpha_{21}$. That is, this numerical example satisfies inequality (1) for any combination of $\alpha_{21}$ and $\alpha_{32}$ in Table 4.

As understood from Table 2, in order to satisfy inequality (1), an odd-order term k of $m_{jk}$ and a phase coefficient C3 that are asymmetrical in the spectral direction between the third reflective surface and the fourth reflective surface are adopted.

TABLE 4

| | | SECOND WAVELENGTH [nm] | | | | |
|---|---|---|---|---|---|---|
| | | 500 | 600 | 700 | 800 | 900 | 1000 |
| FIRST WAVELENGTH [nm] | 400 | 8.942E-10 | 8.997E-10 | 8.959E-10 | 8.991E-10 | 9.004E-10 | 8.995E-10 |
| | 500 | | 9.081E-10 | 8.974E-10 | 9.023E-10 | 9.039E-10 | 9.021E-10 |
| | 600 | | | 8.825E-10 | 8.977E-10 | 9.014E-10 | 8.991E-10 |
| | 700 | | | | 9.179E-10 | 9.155E-10 | 9.084E-10 |
| | 800 | | | | | 9.124E-10 | 9.016E-10 |
| | 900 | | | | | | 8.880E-10 |

Figure 3:
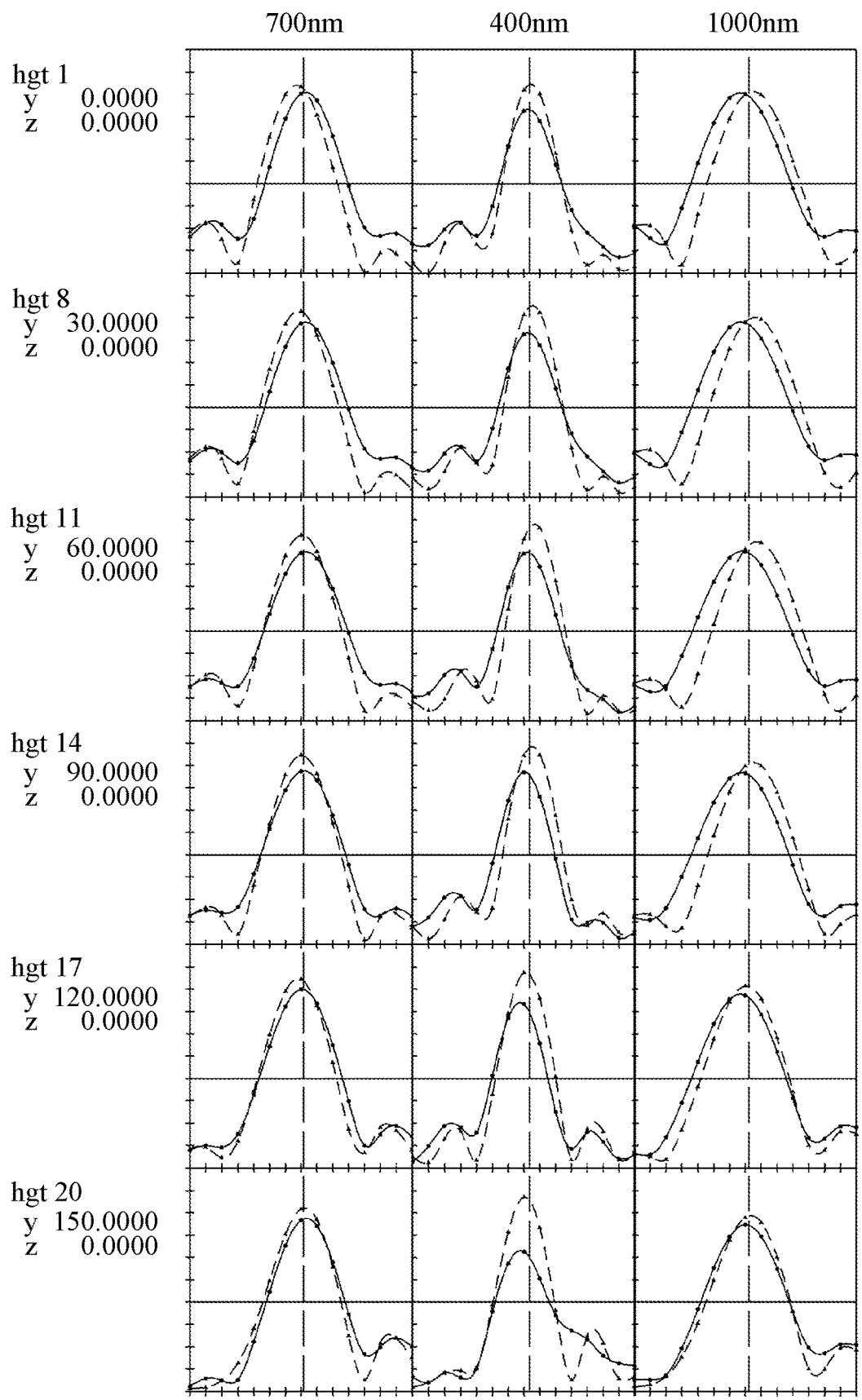
FIG. 3 illustrates a Modulated Transfer Function (MTF) of the spectral image pickup apparatus according to numerical example 1.

FIG. 3 illustrates MTFs of the spectral optical system 10 according to this numerical example. FIG. 3 illustrates the MTFs for wavelengths of 700 nm, 400 nm, and 1000 nm in a case where the object height [mm] in the imaging area is Y=0, 30, 60, 90, 120, and 150, respectively. As illustrated in FIG. 3, the spatial frequency [lines/mm] on the light receiving plane side is 20.0. As understood from FIG. 3, this numerical example satisfactorily correct aberrations over the entire imaging area, and secures a sufficient depth of focus.

Numerical Example 2

Figure 4:
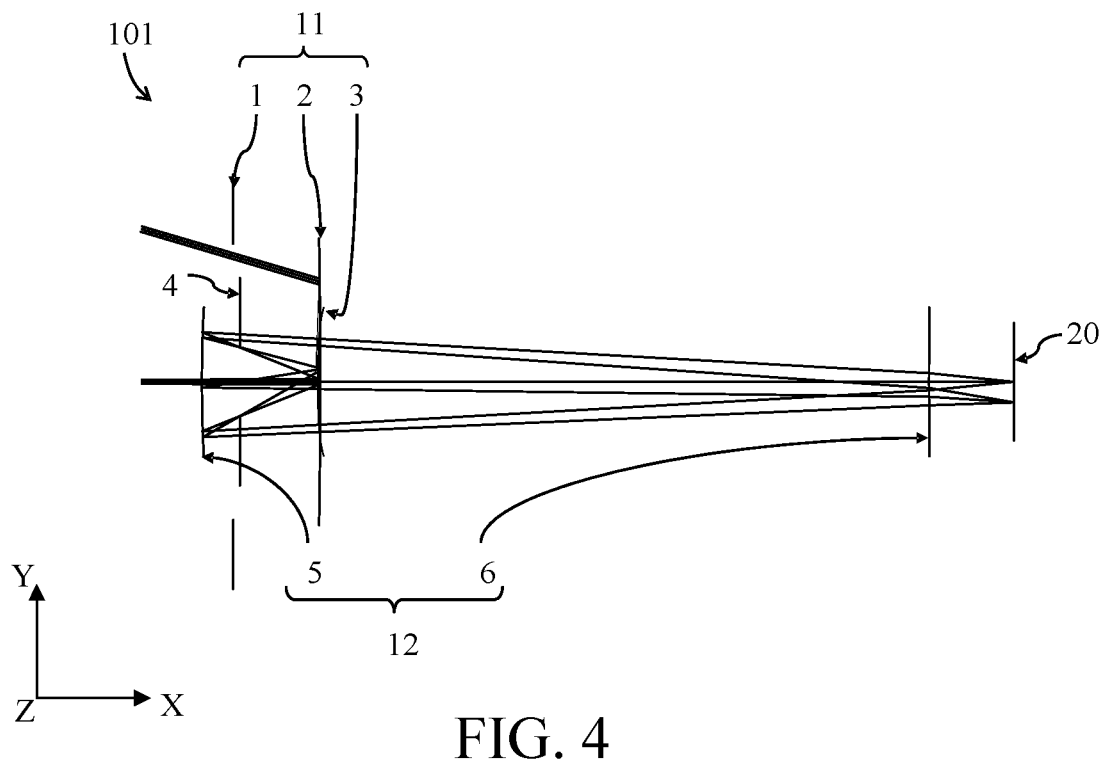
FIG. 4 is an XY sectional view of a spectral image pickup apparatus according to numerical example 2.
Figure 5:
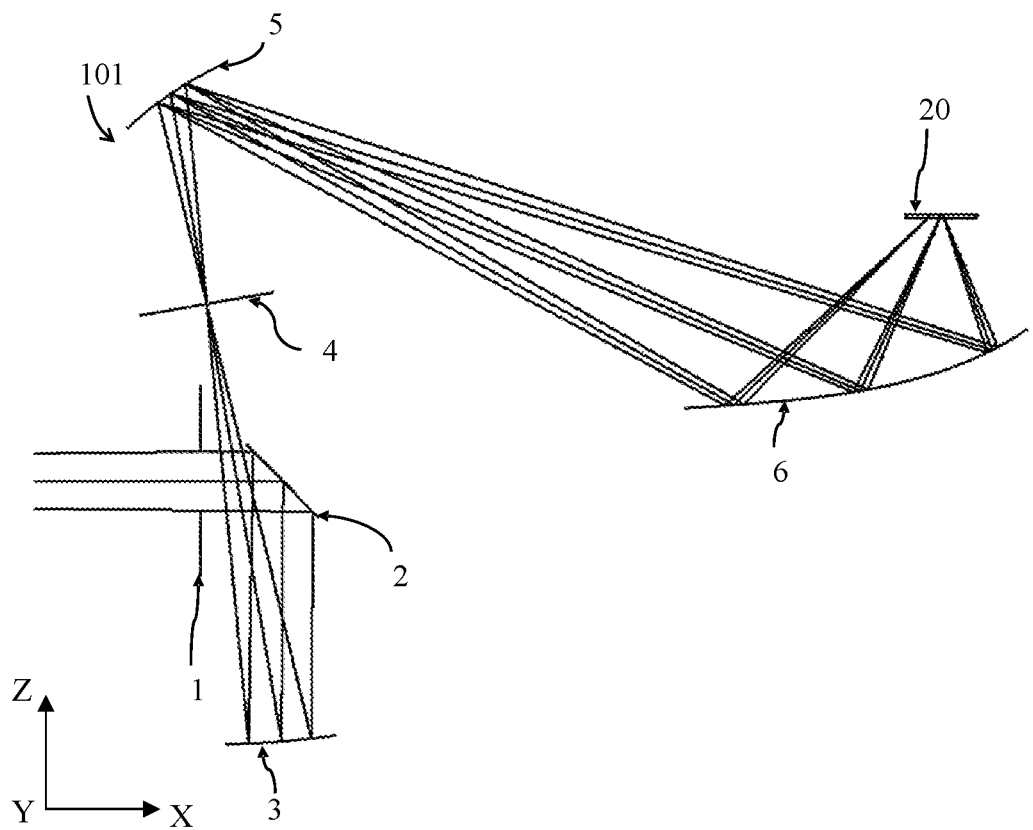
FIG. 5 is a ZX sectional view of the spectral image pickup apparatus according to numerical example 2.

A description will now be given of a spectral optical system 10 according to numerical example 2. FIGS. 4 and 5 respectively illustrate an imaging section and a spectral section of the spectral optical system 10 according to this numerical example. In this numerical example, a description of a configuration similar to that of the spectral optical system 10 according to numerical example 1 will be omitted.

In this numerical example, an object distance from the test object to the aperture stop 1 is 450 mm, and a width in the imaging direction of the imaging area is 300 mm. In the spectral optical system 10 according to this numerical example, a use wavelength band is 400 nm to 1700 nm, which is wider than that of the spectral optical system 10 according to numerical example 1. The width in the spectral direction of the light imaging area within the light receiving plane of the image sensor 20 is 2.16 mm.

Similarly to Table 1, Table 5 illustrates a position of a vertex of each optical surface of the spectral optical system 10 according to this numerical example, a direction of a normal to the vertex, and a radius of curvature at each section. Similarly to Table 2, Table 6 illustrates a shape of each optical surface. Table 7 illustrates the sizes (diameter) [mm] of the aperture in the aperture stop 1, the slit in the light shielding member 4, and the light receiving plane of the image sensor 20. Even in this numerical example, the aperture in the aperture stop 1, the slit in the light shielding member 4, and the light receiving plane are all rectangular.

TABLE 5

| | | X | Y | Z | θ |
|---|---|---|---|---|---|
| APERTURE STOP | 1 | 0.000 | 0.000 | 0.000 | 0.000 |
| FIRST REFLECTIVE SURFACE | 2 | 12.717 | 0.000 | -0.021 | -135.151 |
| SECOND REFLECTIVE SURFACE | 3 | 12.344 | 0.000 | -39.809 | 94.675 |
| LIGHT SHIELDING MEMBER | 4 | 0.958 | 0.000 | 27.099 | 99.729 |
| THIRD REFLECTIVE SURAFCE | 5 | -4.579 | 0.000 | 59.230 | -56.132 |
| FOURTH REFLECTIVE SURFACE | 6 | 101.548 | 0.000 | 13.799 | 99.694 |
| COVER GLASS | 7 | 113.948 | 0.000 | 40.137 | 90.000 |
| LIGHT RECEIVING PLANE | 8 | 113.948 | 0.000 | 40.737 | 90.000 |

| | | d | d' | Ry | Rz |
|---|---|---|---|---|---|
| APERTURE STOP | 1 | 12.717 | 12.696 | | |
| FIRST REFLECTIVE SURFACE | 2 | 39.790 | 39.798 | 1207.362 | 2497.203 |
| SECOND REFLECTIVE SURFACE | 3 | 67.870 | 67.883 | -12.179 | 126.6704 |
| LIGHT SHIELDING MEMBER | 4 | 32.604 | 32.604 | | |
| THIRD REFLECTIVE SURAFCE | 5 | 115.443 | 115.444 | 105.881 | 58.5118 |
| FOURTH REFLECTIVE SURFACE | 6 | 29.111 | 29.038 | -184.34 | 114.7275 |
| COVER GLASS | 7 | 0.600 | 0.625 | | |
| LIGHT RECEIVING PLANE | 8 | | | | |

TABLE 6

| | FIRST REFLECTIVE SURFACE | SECOND REFLECTIVE SURFACE | THIRD REFLECTIVE SURFACE | FOURTH REFLECTIVE SURFACE |
|---|---|---|---|---|
| Ry | 1.207.E+03 | -1.218.E+01 | 1.059.E+02 | -1.843.E+02 |
| Ky | -1.000.E+00 | -1.000.E+00 | -1.000.E+00 | -1.000.E+00 |
| B2 | 0.000.E+00 | 0.000.E+00 | 0.000.E+00 | 0.000.E+00 |
| B4 | 4.826.E-07 | -1.387.E-04 | 1.409.E-07 | 9.151.E-07 |
| B6 | 5.605.E-12 | -2.603.E-06 | -4.408.E-11 | 5.368.E-09 |
| Rz | 0.000.E+00 | 0.000.E+00 | 0.000.E+00 | 0.000.E+00 |
| Kz | 0.000.E+00 | 0.000.E+00 | 0.000.E+00 | 0.000.E+00 |
| E2 | 0.000.E+00 | 0.000.E+00 | 0.000.E+00 | 0.000.E+00 |
| E4 | 0.000.E+00 | 0.000.E+00 | 0.000.E+00 | 0.000.E+00 |
| m01 | 0.000.E+00 | 0.000.E+00 | 0.000.E+00 | 0.000.E+00 |
| m21 | 2.831.E-05 | 3.026.E-04 | 2.025.E-05 | -2.486.E-05 |

TABLE 6-continued

|  | FIRST REFLECTIVE SURFACE | SECOND REFLECTIVE SURFACE | THIRD REFLECTIVE SURFACE | FOURTH REFLECTIVE SURFACE |
|---|---|---|---|---|
| m41 | 2.645.E−08 | 7.049.E−06 | 2.816.E−09 | −1.615.E−08 |
| m02 | 2.002.E−04 | 3.947.E−03 | 8.545.E−03 | 4.358.E−03 |
| m22 | 1.031.E−06 | −8.923.E−06 | 5.612.E−07 | 5.374.E−07 |
| m42 | 8.199.E−10 | −1.402.E−07 | 3.914.E−10 | −2.615.E−09 |
| m03 | 2.562.E−05 | 4.644.E−05 | −3.993.E−05 | −7.676.E−05 |
| m23 | 2.810.E−08 | 3.221.E−07 | 3.792.E−08 | 9.552.E−10 |
| m43 | 1.894.E−11 | 3.727.E−08 | 0.000.E+00 | −7.798.E−11 |
| m04 | −6.290.E−08 | −8.530.E−07 | 3.141.E−08 | 5.500.E−07 |
| m24 | 8.338.E−10 | −2.647.E−08 | 5.401.E−10 | 2.054.E−10 |
| m44 | 0.000.E+00 | 0.000.E+00 | 0.000.E+00 | 1.072.E−11 |
| m05 | 0.000.E+00 | 0.000.E+00 | 0.000.E+00 | 0.000.E+00 |
| m25 | 0.000.E+00 | 0.000.E+00 | 0.000.E+00 | 0.000.E+00 |
| m45 | 0.000.E+00 | 0.000.E+00 | 0.000.E+00 | 0.000.E+00 |
| m06 | 0.000.E+00 | 0.000.E+00 | 0.000.E+00 | 0.000.E+00 |
| m26 | 0.000.E+00 | 0.000.E+00 | 0.000.E+00 | 0.000.E+00 |
| m46 | 0.000.E+00 | 0.000.E+00 | 0.000.E+00 | 0.000.E+00 |
| c1 |  |  | 9.057.E−02 | 1.814.E−01 |
| c2 |  |  | 6.535.E−05 | −1.658.E−03 |
| c3 |  |  | 2.974.E−06 | 6.838.E−06 |
| FUNDAMENTAL WAVELENGTH |  |  | 7.000.E−04 | 7.000.E−04 |
| DIFFRACTION ORDER |  |  | 1 | 1 |

TABLE 7

|  | APERTURE STOP | LIGHT SHIELDING! MEMBER | LIGHT RECEIVING PLANE |
|---|---|---|---|
| DIAMETER (y) | 50.00 | 10.00 | 9.4 |
| DIAMETER (2) | 9.00 | 0.05 |  |

Table 8 illustrates an in a case where the first wavelength $\lambda_1$ and the second wavelength $\lambda_2$ are set to values in the table. As understood from Table 8, this numerical example satisfies inequality (2). In a case where the first wavelength and the second wavelength in Table 8 are replaced with the second wavelength $\lambda_2$ and the third wavelength $\lambda_3$ respectively, $\alpha_{32}$ is illustrated instead of $\alpha_{21}$. This numerical example also satisfies inequality (1) for any combination of $\alpha_{21}$ and $\alpha_{32}$ in Table 8.

TABLE 8

|  |  | SECOND WAVELENGTH [mm] | | | | | |
|---|---|---|---|---|---|---|---|
|  |  | 600 | 800 | 1050 | 1300 | 1500 | 1700 |
| FIRST WAVELENGTH [mm] | 400 | 1.131E−09 | 1.130E−09 | 1.132E−09 | 1.131E−09 | 1.131E−09 | 1.129E−09 |
|  | 600 |  | 1.127E−09 | 1.133E−09 | 1.131E−09 | 1.132E−09 | 1.127E−09 |
|  | 800 |  |  | 1.142E−09 | 1.134E−09 | 1.136E−09 | 1,127E−09 |
|  | 1050 |  |  |  | 1.121E−09 | 1.129E−09 | 1.115E−09 |
|  | 1300 |  |  |  |  | 1.144E−09 | 1.109E−09 |
|  | 1500 |  |  |  |  |  | 1.065E−09 |

Figure 6:
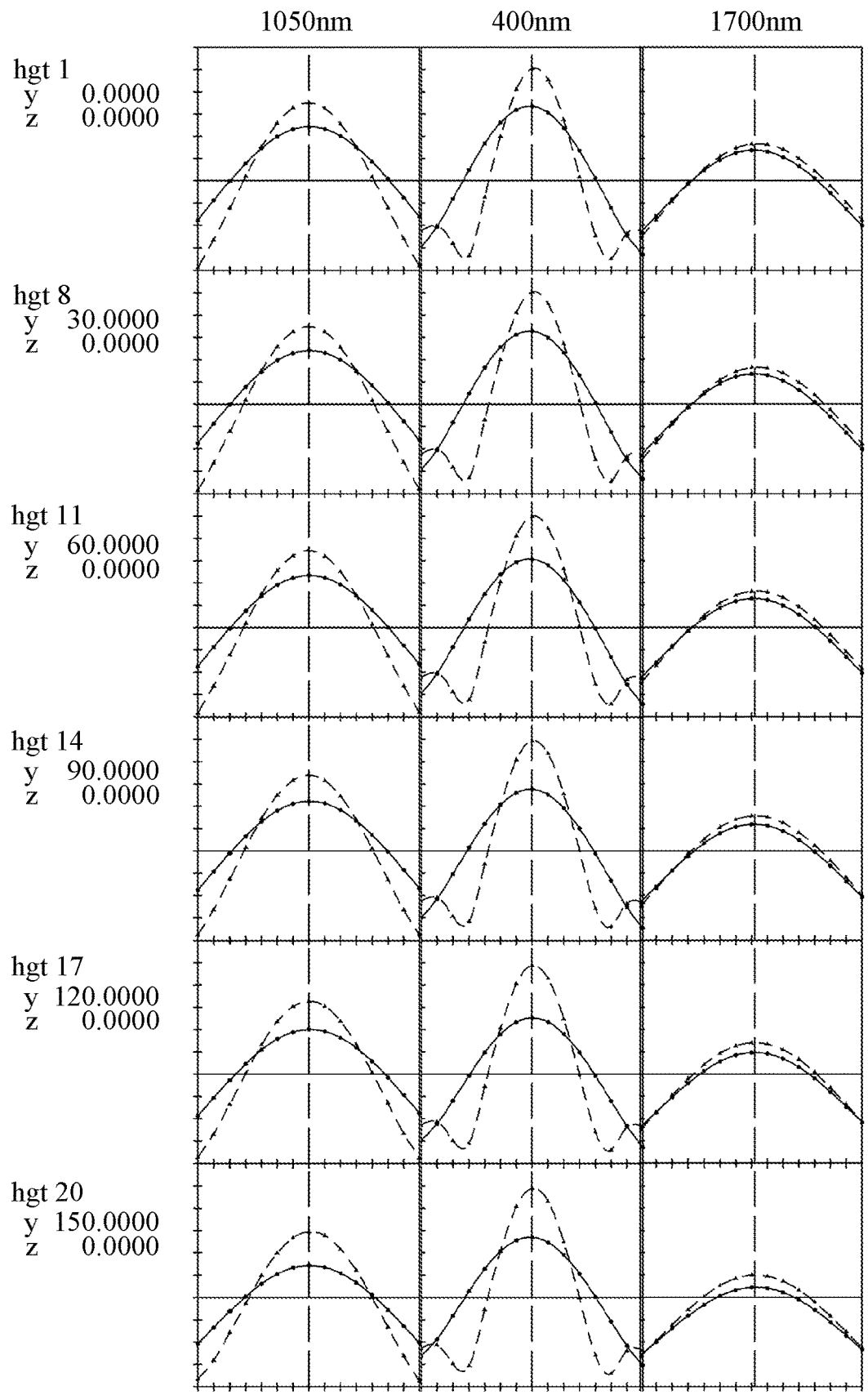
FIG. 6 illustrates an MTF of the spectral image pickup apparatus according to numerical example 2.

FIG. 6 illustrates MTFs of the spectral optical system 10 according to this numerical example, similarly to FIG. 3. As understood from FIG. 5, this numerical example also satisfactorily corrects aberrations over the entire imaging area, and secures a sufficient depth of focus.

Numerical Example 3

Figure 7:
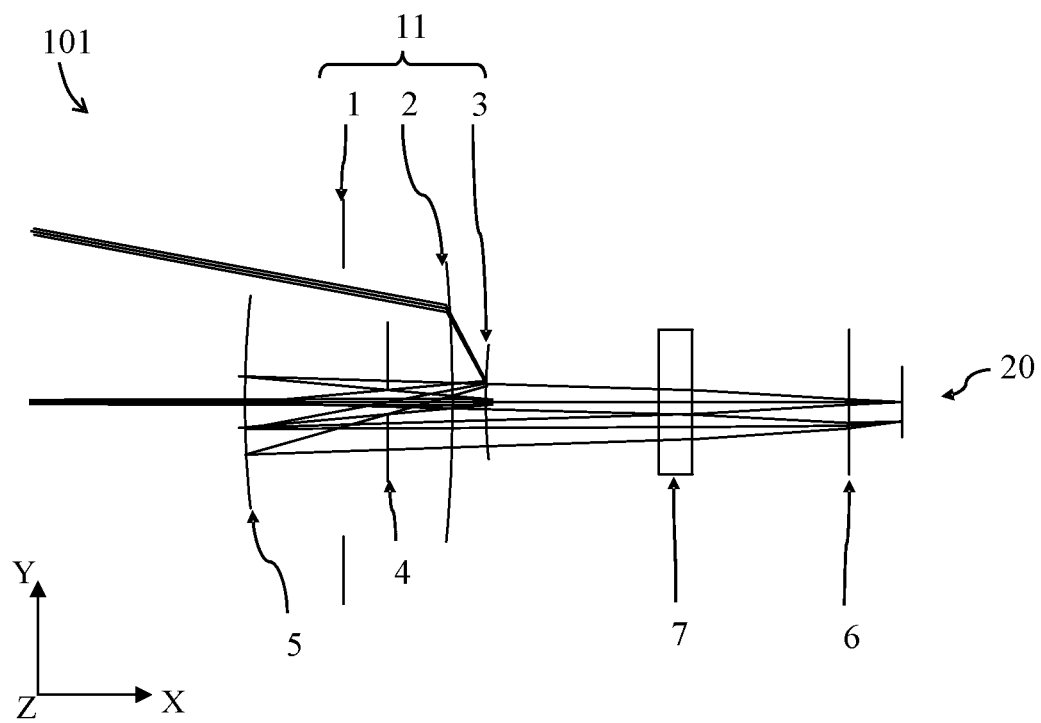
FIG. 7 is an XY sectional view illustrating the configuration of a spectral image pickup apparatus according to numerical example 3.
Figure 8:
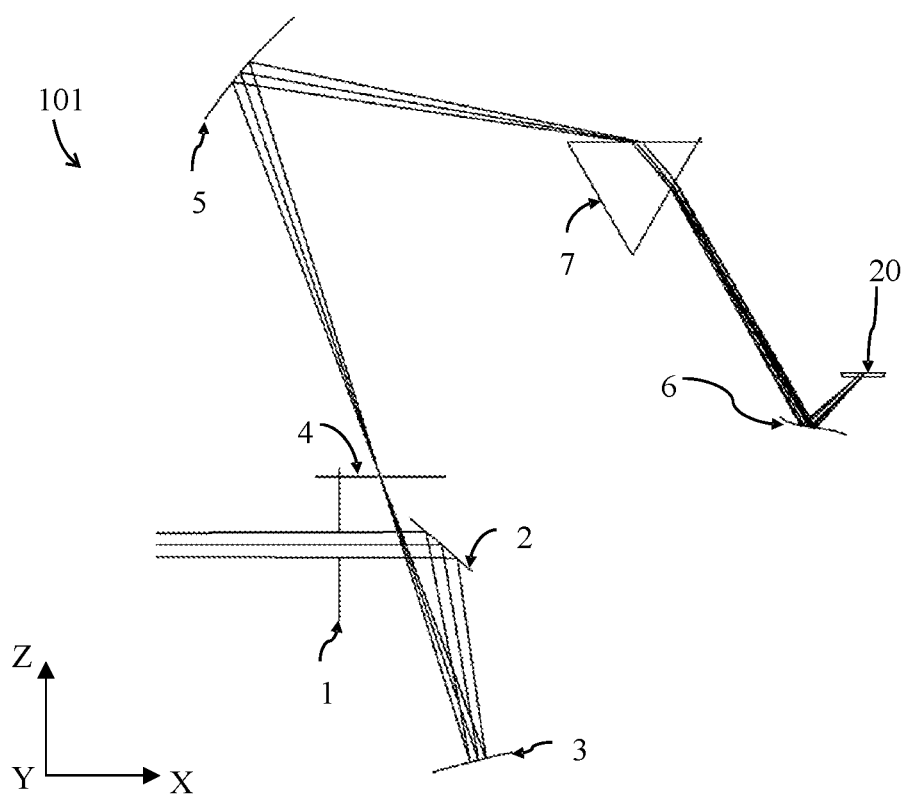
FIG. 8 is a ZX sectional view of the spectral image pickup apparatus according to numerical example 3.

A description will now be given of a spectral optical system 10 according to numerical example 3. FIGS. 7 and 8 respectively illustrate an imaging section and a spectral section of the spectral optical system 10 according to this numerical example. In the spectral optical system 10 according to this numerical example, a description of a configuration similar to that of the spectral optical system 10 according to numerical example 1 will be omitted.

In this numerical example, an object distance from the test object to the aperture stop 1 is 450 mm, and a width in the imaging direction of the imaging area is 300 mm. The wavelength band used is 400 nm to 900 nm, and the width in the spectral direction of the light imaging area on the light receiving plane of the image sensor 20 is 1.35 mm.

The spectral optical system 10 according to this numerical example includes a third reflective surface 5, a prism 8 and a fourth reflective surface (diffractive surface) 6 in the rear group 12. Similarly to Table 1, Table 9 illustrates a position of a vertex of each optical surface of the spectral optical system 10 according to this numerical example, a direction of a normal to the vertex, and a radius of curvature at each section. Table 10 illustrates a shape of each optical surface, similarly to Table 1, and Table 11 illustrates the sizes (diameter) [mm] of the aperture in the aperture stop 1, the slit in the light shielding member 4, and the light receiving plane. Even in this numerical example, the aperture of the aperture stop 1, the slit of the light shielding member 4, and the light receiving plane are all rectangular.

TABLE 9

|  | | X | Y | Z | θ |
|---|---|---|---|---|---|
| APERTURE STOP | 1 | 0.000 | 0.000 | 0.000 | 0.000 |
| FIRST REFLECTIVE SURFACE | 2 | 16.323 | 0.000 | 0.056 | −130.110 |
| SECOND REFLECTIVE SURFACE | 3 | 21.260 | 0.000 | −34.309 | 104.335 |
| LIGHT SHIELDING MEMBER | 4 | 6.592 | 0.000 | 10.813 | 90.000 |
| THIRD REFLECTIVE SURAFCE | 5 | −14.808 | 0.000 | 75.793 | −41.332 |
| PRISM INCIDENT SURFACE | 6 | 47.168 | 0.000 | 63.727 | −90.000 |
| PRISM EXIT SURFACE | 7 | 52.168 | 0.000 | 55.067 | −30.000 |
| FOURTH REFLECTIVE SURFACE | 8 | 75.602 | 0.000 | 18.563 | 82.974 |
| COVER GLASS | 6 | 83.652 | 0.000 | 26.563 | 90.062 |
| LIGHT RECEIVING PLANE | 10 | 83.552 | 0.000 | 27.163 | 0.000 |

|  | | d | d' | Ry | Rz |
|---|---|---|---|---|---|
| APERTURE STOP | 1 | 16.324 | 16.390 | | |
| FIRST REFLECTIVE SURFACE | 2 | 34.718 | 34.557 | 153.0343 | 238.6766 |
| SECOND REFLECTIVE SURFACE | 3 | 47.447 | 47.523 | −23.1051 | 314.6678 |
| LIGHT SHIELDING MEMBER | 4 | 68.413 | 67.709 | | |
| THIRD REFLECTIVE SURAFCE | 5 | 63.139 | 64.014 | 110.3996 | 80.62454 |
| PRISM INCIDENT SURFACE | 6 | 10.000 | 9.017 | | |
| PRISM EXIT SURFACE | 7 | 43.379 | 44.125 | | |
| FOURTH REFLECTIVE SURFACE | 8 | 11.279 | 11.309 | 123.6124 | 41.93616 |
| COVER GLASS | 9 | 0.600 | 0.679 | | |
| LIGHT RECEIVING PLANE | 10 | | | | |

TABLE 10

|  | FIRST REFLECTIVE SURFACE | SECOND REFLECTIVE SURFACE | THIRD REFLECTIVE SURFACE | FOURTH REFLECTIVE SURFACE |
|---|---|---|---|---|
| Ry | 1.530.E+02 | −2.311.E+01 | 1.104.E+02 | 1.236.E+02 |
| Ky | −1.000.E+00 | −1.000.E+00 | −1.000.E+00 | −1.000.E+00 |
| B2 | 0.000.E+00 | 0.000.E+00 | 0.000.E+00 | 0.000.E+00 |
| B4 | 1.064.E−06 | −6.700.E−05 | 2.786.E−08 | 2.505.E−05 |
| B6 | −9.773.E−10 | 3.855.E−07 | 6.165.E−10 | −3.001.E−07 |
| Rz | 0.000.E+00 | 0.000.E+00 | 0.000.E+00 | 0.000.E+00 |
| Kz | 0.000.E+00 | 0.000.E+00 | 0.000.E+00 | 0.000.E+00 |
| E2 | 0.000.E+00 | 0.000.E+00 | 0.000.E+00 | 0.000.E+00 |
| E4 | 0.000.E+00 | 0.000.E+00 | 0.000.E+00 | 0.000.E+00 |
| m01 | 0.000.E+00 | 0.000.E+00 | 0.000.E+00 | 0.000.E+00 |
| m21 | 1.053.E−04 | 5.750.E−04 | −7.228.E−06 | 2.292.E−04 |
| m41 | 4.353.8−08 | 4.149.E−06 | −2.254.E−08 | −1.130.E−05 |
| m02 | 2.095.E−03 | 1.589.E−03 | 6.202.E−03 | 1.192.E−02 |
| m22 | 2.660.E−06 | −4.399.E−05 | −1.494.E−06 | 3.004.E−05 |
| m42 | 9.122.E−10 | 2.938.E−08 | 5.144.E−08 | −3.428.E−07 |
| m03 | 4.541.E−05 | 1.299.E−04 | −1.433.E−05 | 4.758.E−03 |
| m23 | 1.070.E−07 | −1.980.E−05 | −2.846.E−07 | 2.562.E−05 |
| m43 | −1.921.E−10 | 2.617.E−06 | −1.866.E−09 | 5.949.E−07 |
| m04 | 6.603.E−07 | −5.544.E−05 | 2.918.E−06 | −6.65S.E−04 |
| m24 | 2.375.E−08 | −1.470.E−05 | 1.101.E−07 | −1.932.E−05 |
| m44 | 1.067.E−11 | 6.187.E−08 | 3.980.E−09 | 1.817.E−07 |
| m05 | 0.000.E+00 | 0.000.E+00 | 0.000.E+00 | 0.000.E+00 |
| m25 | 0.000.E+00 | 0.000.E+00 | 0.000.E+00 | 0.000.E+00 |
| m45 | 0.000.E+00 | 0.000.E+00 | 0.000.E+00 | 0.000.E+00 |
| m06 | 1.151.E−07 | −1.315.E−06 | −7.536.E−08 | 1.766.E−05 |
| m26 | −3.186.E−10 | −1.678.E−07 | −9.087.E−09 | 1.082.E−06 |
| m46 | −2.705.E−13 | −3.600.E−08 | 1.867.E−10 | −1.352.E−08 |
| c1 | | | | −2.653.E−03 |
| c2 | | | | −2.165.E−03 |
| c3 | | | | 7.456.E−03 |
| FUNDAMENTAL WAVELENGTH | | | | 7.000.E−04 |
| DIFFRACTION ORDER | | | | 1 |

TABLE 11

|  | APERTURE STOP | LIGHT SHIELDING MEMBER | LIGHT RECEIVING PLANE |
|---|---|---|---|
| DIAMETER (y) | 40.0 | 3.60 | 9.4 |
| DIAMETER (z) | 4.0 | 0.05 | 6.0 |

Table 12 illustrates an in a case where the first wavelength $\lambda_1$ and the second wavelength $\lambda_2$ are set to values in the table. As understood Table 12, this numerical example satisfies inequality (2). In a case where the first wavelength and the second wavelength in Table 12 are replaced with the second wavelength X2 and the third wavelength $\lambda_3$ respectively, $\alpha_{32}$ is illustrated instead of $\alpha_{21}$. That is, this numerical example also satisfies the expression (1) for any combination of $\alpha_{21}$ and $\alpha_{32}$ in Table 12.

TABLE 12

|  |  | SECOND WAVELENGTH [mm] | | | | |
|---|---|---|---|---|---|---|
|  |  | 500 | 600 | 700 | 800 | 900 |
| FIRST WAVELENGTH [mm] | 400 | 6.045E–10 | 5.985E–10 | 5.976E–10 | 5.980E–10 | 5.993E–10 |
|  | 500 |  | 5.894E–10 | 5.916E–10 | 5.937E–10 | 5.963E–10 |
|  | 600 |  |  | 5.947E–10 | 5.971E–10 | 6.005E–10 |
|  | 700 |  |  |  | 6.002E–10 | 6.048E–10 |
|  | 800 |  |  |  |  | 6.107E–10 |

Figure 9:
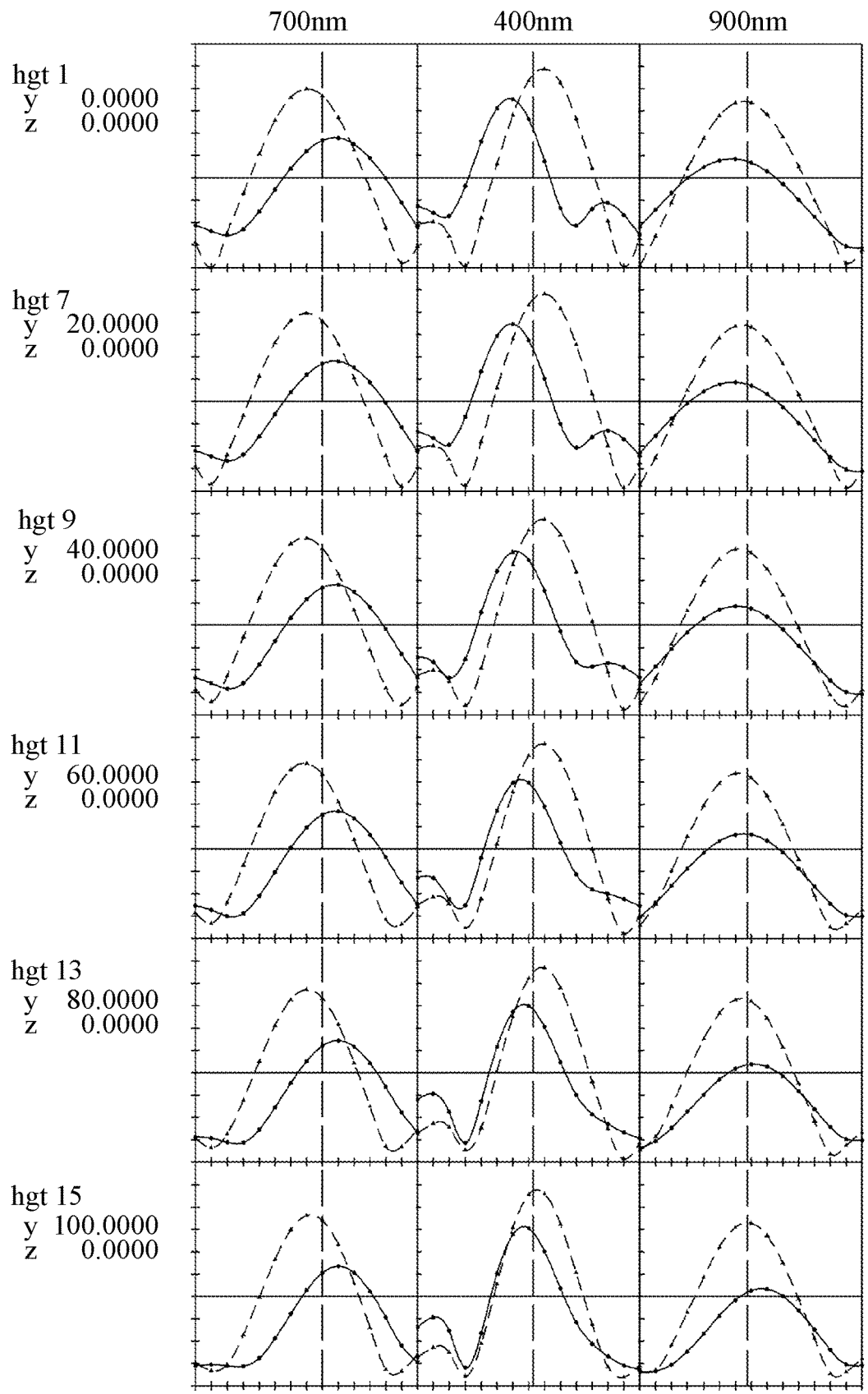
FIG. 9 illustrates an MTF of the spectral image pickup apparatus according to numerical example 3.

FIG. 9 illustrates MTFs of the spectral optical system 10 according to this numerical example, similarly to FIG. 3. As understood from FIG. 9, this numerical example also satisfactorily corrects aberrations over the entire imaging area, and secures a sufficient depth of focus.

Thickness Measuring Apparatus

Figure 10:
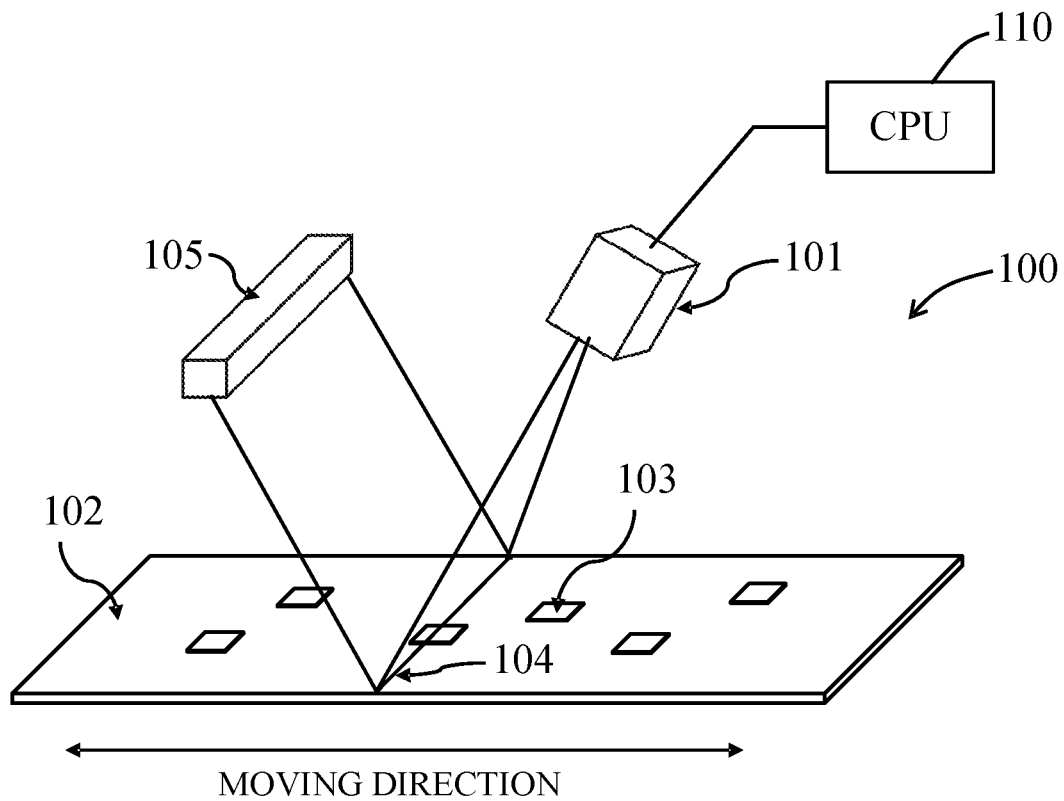
FIG. 10 illustrates the configuration of a film thickness measuring apparatus using the spectral image pickup apparatus according to each example.

FIG. 10 illustrates the configuration of a film thickness measuring apparatus 100 as an imaging system (measuring apparatus) using the spectral image pickup apparatus 101 according to any one of the above examples. The film thickness measuring apparatus 100 includes an illumination unit 105 configured to irradiate a test object 103 to be measured with illumination light, a spectral image pickup apparatus 101 according to any one of the examples, and a conveyor unit 102 configured to change relative positions among the illumination unit 105, the spectral image pickup apparatus 101, and the test object 103. The film thickness measuring apparatus 100 further includes a film thickness calculating unit (film thickness acquiring unit) 110 configured to calculate the film thickness of the test object 103 based on image information obtained from the image sensor 20 in the spectral image pickup apparatus 101. The film thickness calculating unit 110 includes a processor such as a CPU. The film thickness calculating unit 110 may be provided inside the spectral image pickup apparatus 101.

The illumination unit 105 may include a light source configured to emit illumination light in a wide band including a wavelength band measurable by the spectral image pickup apparatus 101. The light source can use an LED, a halogen lamp, or the like. The illumination unit 105 can irradiate the test object 103 with linear illumination light extending in the imaging direction (Y direction) in accordance with the imaging range of the spectral image pickup apparatus 101.

In FIG. 10, the spectral image pickup apparatus 101 is configured to image reflected light from the test object 103 irradiated with the illumination light, but may image transmitting light through the test object.

The conveyor unit 102 includes a belt conveyor or the like that moves the test object 103 in the Z direction. By moving the test object 103 in the Z direction, the spectral image pickup apparatus 101 can image the reflected light (or transmitting light) from a plurality of positions (linear areas) in the Z direction on the test object 103. In measuring the film thickness of a large test object that is difficult to convey by the belt conveyor or the like, or a test object that is difficult to move, the conveyor unit 102 may move the illumination unit 105 and the spectral image pickup apparatus 101 in the Z direction. The conveyor unit 102 may be configured to move both the test object 103, and a combination of the image pickup apparatus and the illumination unit. Alternatively, the conveyor unit 102 may move the test object 103, the combination of the illumination unit 105 and the spectral image pickup apparatus 101 in directions opposite to each other in the Z direction. The conveyor unit 102 may adjust the relative positions of the test object 103 and the illumination unit 105 and the spectral image pickup apparatus 101 in the optical axis direction (X-axis direction).

In addition, by placing a drivable focusing optical member inside or outside the spectral optical system 10 in the spectral image pickup apparatus 101 and adjusting the position of the optical member, the test object 103 can be focused.

Film Thickness Calculating Method

Figure 11:
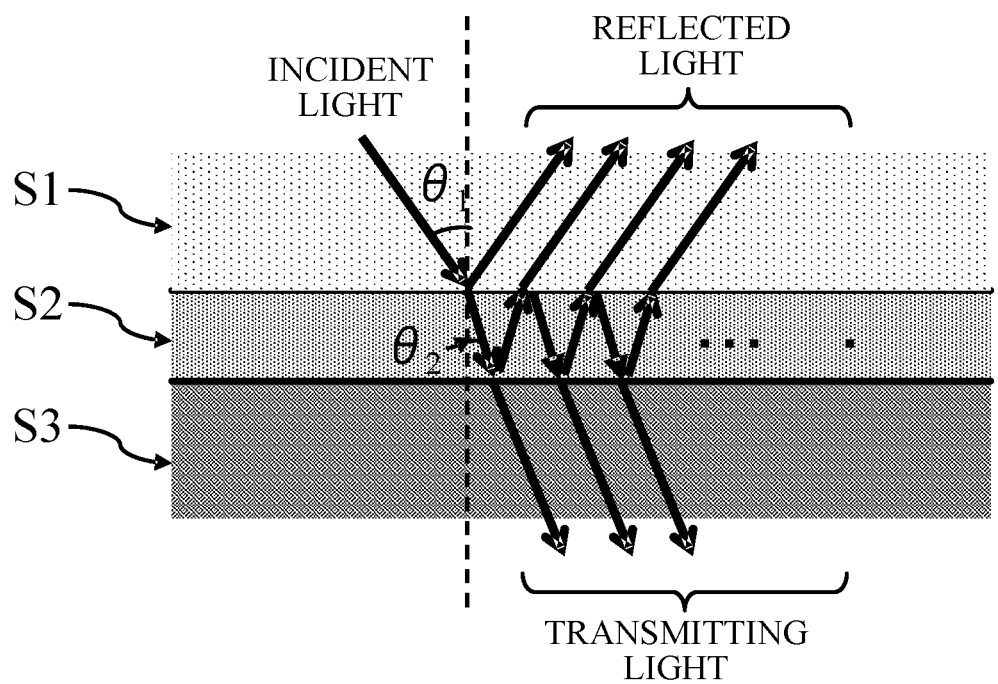
FIG. 11 explains a film thickness calculating method using the film thickness measuring apparatus.

A description will now be given of film thickness calculating processing to be executed by the film thickness calculating unit 110 according to a program. FIG. 11 illustrates a thin film S2 disposed between media S1 and S3. Part of light incident from the medium S1 is reflected at a boundary between the medium S1 and the thin film S2 and becomes reflected light. The remaining light is reflected at the boundary between the thin film S2 and the medium S3 and becomes a component (reflected light) to be emitted from the medium S1, a component that is multi-reflected between the two boundaries (within the thin film S2), and a component (transmitting light) to be emitted from the medium S3.

At this time, when the multi-reflection within the thin film S2 is considered, the energy transmittance T and the energy reflectance R are respectively represented by the following equations (7):

$$R = \frac{r_{12}^2 + r_{23}^2 + 2r_{12}r_{23} \cos \Delta}{1 + r_{12}^2 r_{23}^2 + 2r_{12}r_{23} \cos \Delta} \qquad (7)$$

$$T = \frac{1 - r_{12}^2 - r_{23}^2 + r_{12}^2 r_{23}^2}{1 + r_{12}^2 r_{23}^2 + 2r_{12}r_{23} \cos \Delta}$$

In equations (7), amplitude reflectance $r_{12}$ represents an amplitude reflectance in a case where the light incident from the medium S1 is reflected at the boundary between the medium S1 and the thin film S2. $\Delta(\lambda)$ represents a phase difference caused by reflection of light within the thin film S2 and is represented by the following equation (8):

$$\Delta(\lambda) = \frac{4\pi n_2 d \cos \theta_2}{\lambda} \quad (8)$$

In equation (8), $n_2$ is a refractive index of the thin film S2 for light having wavelength $\lambda$, d is a film thickness of the thin film S2, and $\theta_2$ is a refracting angle in the thin film S2 in a case where the light is incident from the medium S1 at the incident angle $\theta_1$. According to equation (8), in a case where the wavelength $\lambda$ is changed, the phase difference $\Delta(\lambda)$ changes, and in a case where the phase difference $\Delta$ changes, the energy reflectance R and the energy transmittance T oscillate. In order to improve the predictability of the vibration component, the energy reflectance $R(\lambda)$ and the energy transmittance $T(\lambda)$ are converted, and the converted reflectance $R'(\lambda)$ and the converted reflectance $R'(\lambda)$ are expressed by the following equations (9):

$$R'(\lambda) = \frac{R}{1-R} = \frac{r_{12}^2 + r_{23}^2}{1 - r_{12}^2 - r_{23}^2 + r_{12}^2 r_{23}^2} + \frac{2 r_{12} r_{23}}{1 - r_{12}^2 - r_{23}^2 + r_{12}^2 r_{23}^2} \cos \Delta(\lambda) \quad (9)$$

$$T'(\lambda) = \frac{1}{T} = \frac{1 + r_{12}^2 r_{23}^2}{1 - r_{12}^2 - r_{23}^2 + r_{12}^2 r_{23}^2} + \frac{2 r_{12} r_{23}}{1 - r_{12}^2 - r_{23}^2 + r_{12}^2 r_{23}^2} \cos \Delta(\lambda)$$

Next, the Fourier transform for analyzing the vibration components of the converted reflectance $R'(\lambda)$ and the converted reflectance $R'(\lambda)$ due to the change in the phase difference is not available, if the phase difference $\Delta(\lambda)$ becomes nonlinear relative to the wavelength $\lambda$. Accordingly, the wavelength $\lambda$ of the phase difference $\Delta(\lambda)$ is converted into the wavenumber K, which is a reciprocal of the wavelength. The converted phase difference $\Delta(K)$, converted reflectance $R'(K)$, and converted reflectance $R'(K)$ are expressed by the following equations (10):

$$\Delta(K) = 4\pi n_2 d \cos \theta_2 K$$

$$R'(K) = \frac{r_{12}^2 + r_{23}^2}{1 - r_{12}^2 - r_{23}^2 + r_{12}^2 r_{23}^2} + \frac{2 r_{12} r_{23}}{1 - r_{12}^2 - r_{23}^2 + r_{12}^2 r_{23}^2} \cos \Delta(K) \quad (10)$$

$$T'(K) = \frac{1 + r_{12}^2 r_{23}^2}{1 - r_{12}^2 - r_{23}^2 + r_{12}^2 r_{23}^2} + \frac{2 r_{12} r_{23}}{1 - r_{12}^2 - r_{23}^2 + r_{12}^2 r_{23}^2} \cos \Delta(K)$$

Due to the conversion of equations (10), the phase difference $\Delta(K)$ has a linear relationship with the wavenumber K, so the Fourier transform becomes available. Since the peak position of the power spectrum obtained by the Fourier transform corresponds to the film thickness d of the thin film S2, the film thickness d can be calculated from the peak position. Then, the film thickness distribution in the imaging direction can be calculated by performing the film thickness calculating processing described above for the energy transmittance T or the energy reflectance R of the test object at each position in the imaging direction (Y direction).

Figure 12A:
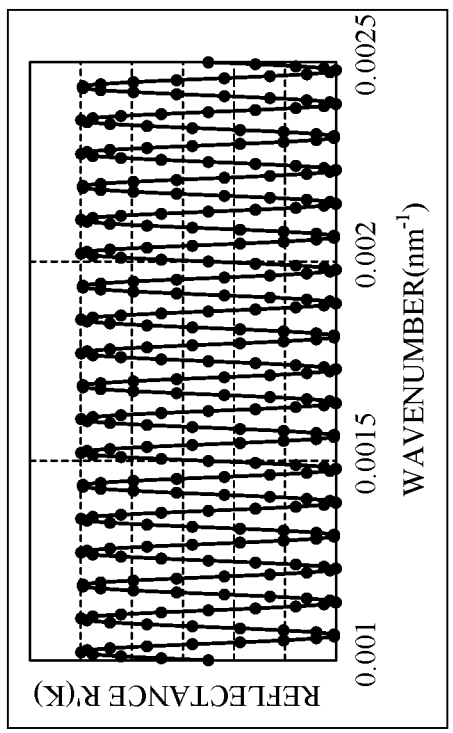
FIGS. 12A and 12B illustrate converted reflectance and converted transmittance before and after wavenumber conversion is performed.
Figure 12A:
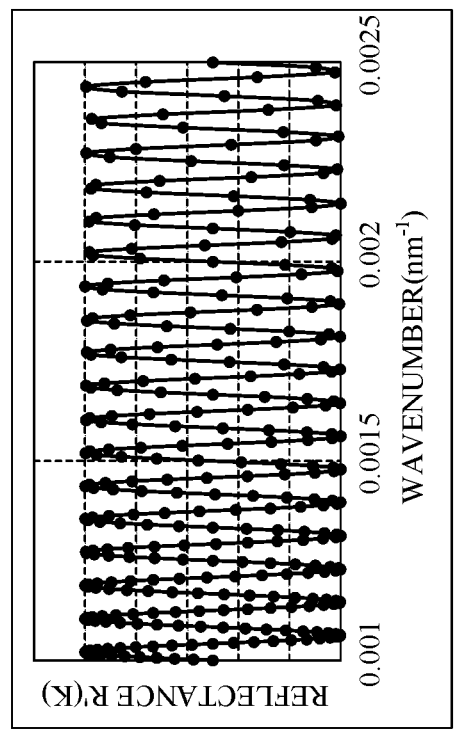

FIG. 12A illustrates an example of the converted reflectance $R'(\lambda)$ before wavenumber conversion is performed and the converted reflectance $R'(K)$ after the wavenumber conversion is performed, which are obtained by the film thickness measuring apparatus 100. A horizontal axis represents the wavenumber [nm$^{-1}$], and a vertical axis represents the conversion reflectance $R'(K)$. The converted reflectance $R'(\lambda)$ before wavenumber conversion is performed and the conversion rate $T'(K)$ after wavenumber conversion is performed are similarly obtained.

As understood from FIG. 12A, the wavenumber conversion can provide the converted reflectance $R'(K)$ sampled at regular intervals in the wavenumber direction (horizontal axis direction). By sampling the converted reflectance $R'(K)$ at regular intervals in the wavenumber direction, the fast Fourier transform (FFT) can be applied to the Fourier transform, and the film thickness calculating processing can be expedited.

Figure 12B:
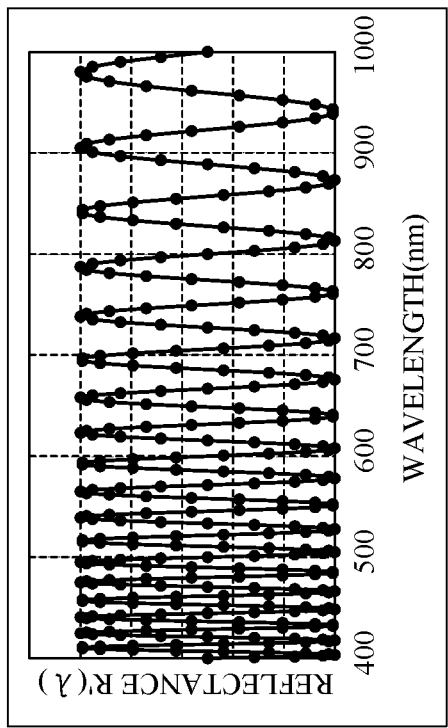
Figure 12B:
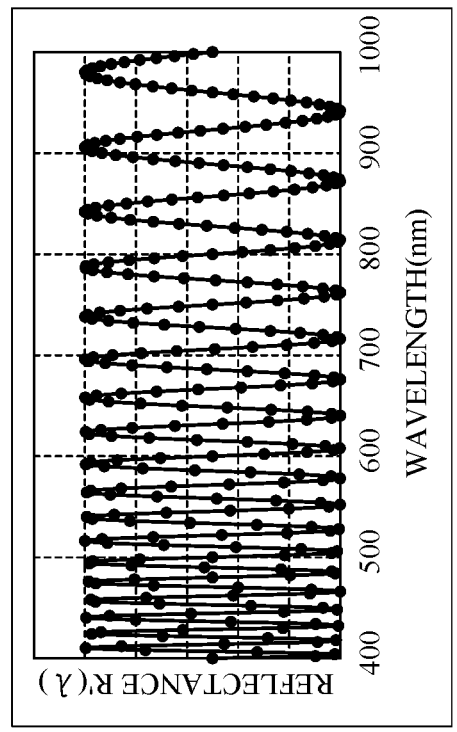

FIG. 12B illustrates an example of the converted reflectance $R'(\lambda)$ before and after the wavenumber conversion is performed in prior art. The converted transmittance $T'(\lambda)$ is similarly obtained. As illustrated in FIG. 12B, since the converted reflectance $R'(\lambda)$ before wavenumber conversion is performed is sampled at regular intervals with respect to the wavelength $\lambda$, the sampling intervals in the wavenumber direction of the converted reflectance $R'(\lambda)$ after the wavenumber conversion is performed are irregular intervals. An alternate long and short dash line in FIG. 13 represents that a slope $\alpha_{21}'$ between the first wavelength $\lambda_2$ and the second wavelength $\lambda_2$ and a slope $\alpha_{32}'$ between the second wavelength $\lambda_2$ and the third wavelength $\lambda_3$ in the prior art are clearly different (nonlinear).

In a case where the converted reflectance $R'(\lambda)$ after the wavenumber conversion is performed is sampled at irregular intervals, resampling processing becomes necessary to make the sampling intervals regular in order to use the FFT for the Fourier transform. This additional processing increases the processing time and reduces the film thickness measuring accuracy. Even if the sampling interval is irregular, the Lomb-Scargle method can be applied to find the power spectrum, but the processing time becomes longer than that of the FFT.

On the other hand, since the film thickness measuring apparatus 100 according to this example does not require resampling processing, the film thickness calculating processing can be made faster. It is especially suitable for real-time measurement and in-line measurement that require high-speed processing.

The film thickness calculating method may use a method for determining a film thickness by optimizing the obtained wavelength characteristics of the reflectance and transmittance using a refractive index, an incident angle, a wavelength, and a film thickness as variables in the theoretical equations.

The spectral image pickup apparatus according to the above example may be used for applications other than film thickness measurement. For example, a description will be given of a method for inspecting a test object (article) using a spectral image pickup apparatus and a method for manufacturing the article. The inspection method here is suitable for inspection (evaluation) of the article in the industrial field such as manufacturing, agriculture, and medicine.

In the first step (imaging step) in the inspection method, image information of the test object is obtained by imaging the test object via the spectral optical system 10. At this time, the spectral imaging system described above can be used. That is, image information of the entire test object can be acquired by imaging the test object while the relative positions among the test object and the spectral image pickup apparatus are changed. Image information of a plurality of test objects can be sequentially and continuously acquired. In addition, in the first step, a plurality of pieces of image information corresponding to a plurality of wavelengths of lights emitted from the spectral optical system may be obtained.

Next, in the second step (inspection step), the test object is inspected based on the image information acquired in the first step. At this time, for example, the user (inspector) may check (determine) whether or not there is foreign matter, flaws, etc. in the image information, or image processing may detect foreign matter, flaws, etc. in the image information and the user may be notified of the result. A manufacturing apparatus for manufacturing an article may be controlled or adjusted according to the determination result of the presence or absence of the foreign matter or flow.

In the second step, the test object may be inspected based on the spectral distribution of the test object obtained using a plurality of pieces of image information for respective wavelengths. The image information acquired by imaging through the spectral optical system enables spectral distribution unique to the test object to be detected, and the materials of the test object to be specified from the spectral distribution. For example, image information highlighted by coloring or another method may be generated for each spectrum, and the user may inspect the test object based on the image information.

The inspection method according to this example is applicable to manufacturing methods for articles such as semiconductors, foods, pharmaceuticals, and cosmetics. More specifically, a material (object) for manufacturing an article can be inspected by the above inspection method, and the article can be manufactured using the inspected material. For example, in a case where it is determined that the material has foreign matter or flaws in the second step described above, the user (manufacturer) or the manufacturing apparatus removes the foreign matter from the material or discards the material containing the foreign matter or flaws.

The above inspection method may be used to detect abnormalities in a manufacturing apparatus. For example, the presence or absence of an abnormality may be determined based on the image information of the manufacturing apparatus, and depending on the determination result, the driving of the manufacturing apparatus may be stopped or the abnormality may be corrected.

The present disclosure provides an image pickup apparatus that can quickly and accurately measure a test object.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-128654, filed on Aug. 12, 2022, which is hereby incorporated by reference herein in its entirety.

What is claimed is:

1. An image pickup apparatus comprising:
an image sensor; and
an optical system includes a dispersion element and a diffractive element,
wherein the dispersion element is configured to divide light from an area extending in a first direction of an object into a plurality of lights in a section orthogonal to the first direction,
wherein the diffractive element is configured to condense the plurality of lights on an imaging surface of the image sensor,
wherein a base surface of a diffractive surface of the diffractive element is asymmetric in the first direction, and
wherein the following inequalities are satisfied:

$$0.90 \leq \alpha_{21}/\alpha_{32} \leq 1.10$$

$$1 \times 10^{-12} \leq |\alpha_{21}| \leq 1 \times 10^{-6}$$

where $\lambda_1$, $\lambda_2$, and $\lambda_3$ are wavelengths of first light, second light, and third light among the plurality of lights, respectively, satisfying the following inequality, $z_1$, $z_2$, and $z_3$ are condensed positions of the first, second, and third lights on the imaging surface in the section, respectively, and $\alpha_{21}$ and $\alpha_{32}$ are defined as follows:

$$\lambda_1 < \lambda_2 < \lambda_3$$

$$\alpha_{21} = (z_2 - z_1)/(1/\lambda_2 - 1/\lambda_1)$$

$$\alpha_{32} = (z_3 - z_2)/(1/\lambda_3 - 1/\lambda_2).$$

2. The image pickup apparatus according to claim 1, wherein the optical system includes a front group on an object side and a rear group on an image side of a light shielding member having an opening that is extending in the first direction, and
wherein the rear group includes the dispersion elements and the diffractive element.

3. The image pickup apparatus according to claim 1, wherein the dispersion element is a diffractive element or a prism.

4. The image pickup apparatus according to claim 1, wherein the base surface is an anamorphic surface.

5. The image pickup apparatus according to claim 2, wherein each of the front group and the rear group includes an anamorphic surface.

6. The image pickup apparatus according to claim 2, wherein at least one of optical surfaces included in the front group and the rear group is a reflective surface.

7. The image pickup apparatus according to claim 2, wherein the front group makes light directing toward the opening condense and pass through the opening so that the light is not condensed in the first direction.

8. A spectral imaging system comprising:
the image pickup apparatus according to claim 1; and
a conveyor unit configured to change a relative position between the image pickup apparatus and the object.

9. A measuring apparatus comprising:
the image pickup apparatus according to claim 1; and
an acquiring unit configured to acquire a thickness of the object from an output of the image sensor.

10. An article manufacturing method comprising:
acquiring image information of the object using the image pickup apparatus according to claim 1; and
inspecting or measuring the object using the image information.

* * * * *